United States Patent
Okuno

(10) Patent No.: US 7,656,887 B2
(45) Date of Patent: Feb. 2, 2010

(54) TRAFFIC CONTROL METHOD FOR NETWORK EQUIPMENT

(75) Inventor: Michitaka Okuno, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 593 days.

(21) Appl. No.: 11/195,702

(22) Filed: Aug. 3, 2005

(65) Prior Publication Data

US 2006/0098675 A1    May 11, 2006

(30) Foreign Application Priority Data

Nov. 5, 2004    (JP) .............................. 2004-321458

(51) Int. Cl.
*H04L 12/28* (2006.01)
*H04L 12/56* (2006.01)

(52) U.S. Cl. .................. 370/412; 370/392; 370/395.42; 370/395.32

(58) Field of Classification Search ................ 370/412, 370/392, 394.42, 395.32
See application file for complete search history.

(56) References Cited

U.S. PATENT DOCUMENTS

| | | | |
|---|---|---|---|
| 5,850,399 A | | 12/1998 | Ganmukhi et al. |
| 6,327,625 B1 * | | 12/2001 | Wang et al. .................. 709/235 |
| 6,385,204 B1 * | | 5/2002 | Hoefelmeyer et al. ....... 370/401 |
| 6,714,553 B1 * | | 3/2004 | Poole et al. .................. 370/412 |
| 6,917,934 B2 * | | 7/2005 | Cheng et al. .................... 707/3 |
| 2002/0071387 A1 | | 6/2002 | Horiguchi et al. |
| 2003/0037154 A1 * | | 2/2003 | Poggio et al. ................ 709/230 |
| 2003/0202517 A1 | | 10/2003 | Kobayakawa et al. |
| 2005/0286513 A1 * | | 12/2005 | King ........................... 370/389 |
| 2006/0002392 A1 * | | 1/2006 | Malerevich .................. 370/392 |

FOREIGN PATENT DOCUMENTS

| | | |
|---|---|---|
| EP | 0 989 770 B1 | 3/2000 |
| JP | 2004-260532 | 9/2004 |
| JP | 2005-117206 | 4/2005 |

* cited by examiner

*Primary Examiner*—Dang T Ton
*Assistant Examiner*—Robert M Morlan
(74) *Attorney, Agent, or Firm*—Antonelli, Terry, Stout & Kraus, LLP

(57) ABSTRACT

A function block containing a process-cache tag for storing process-cache tags in the pre-stage of a process cache and an FIFO queue for each tag entry are installed as a traffic controller. The traffic controller stacks packet groups, identified as being from the same flow, in the same FIFO queue. Each FIFO queue records the logged state of the corresponding process queues, and when a packet arrives at an FIFO queue entry in a non-registered state, only its first packet is conveyed to a function block for processing the process-cache misses, and then it awaits registration in a process cache. Access to the process cache from the FIFO queue is implemented at the time that registration of the second and subsequent packets in the process cache are completed. This allows packets other than the first packet in the flow to always access the process cache for a cache hit.

20 Claims, 16 Drawing Sheets

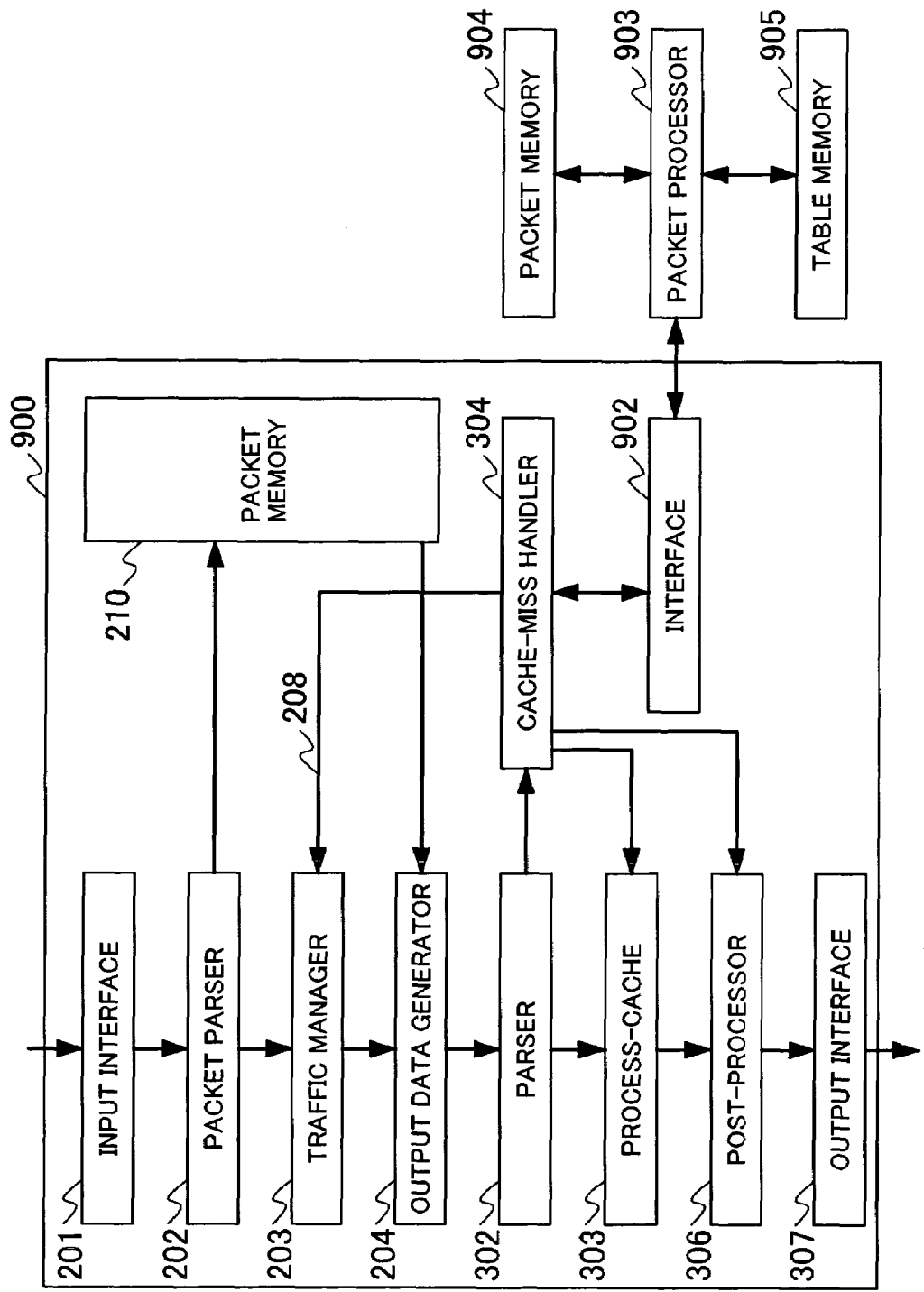

TRAFFIC CONTROL METHOD FOR NETWORK EQUIPMENT

CLAIM OF PRIORITY

The present application claims priority from Japanese application JP 2004-321458, filed on Nov. 5, 2004, the content of which is hereby incorporated by reference into this application.

FIELD OF THE INVENTION

The present invention relates to in general a method to be used for configuring network equipment, such as routers and switches, for low-delay switching systems for large volume packets. The present invention relates, in particular, to a technology for providing basic components of network equipment that is effective for regulating traffic for an ASIC (Application Specific Integrated Circuit) and network processors for processing of MAC frame (Media Access Control) and IP (Internet Protocol) packets utilizing caches.

BACKGROUND OF THE INVENTION

In the communications field, network equipment, such as routers and switches, are utilized for establishing a connection between multiple networks. The network equipment carries out communications by sending and receiving data, referred to as frames, based on layer 2 MAC and layer 3 IP based packets. Hereafter, one data unit will be to be referred to as a packet. The network equipment investigates the destination address of the received packet, determines the transfer destination of that packet, repeatedly 3 transfers packets to the specified transfer destination, and conveys the packet to the target destination. With the overall volume of packets that are being sent and received on networks worldwide greatly expanding, the packet transfer performance of network equipment must also be improved to keep pace with the increasing amount of traffic. Better transfer performance involves not simply transferring the packet, but also providing processing for transferring only those packets conforming to established rules (filtering), limiting the packet transfer volume to within a specified amount per unit of time in compliance with rules (shaping), sending packets after establishing an order of priority among packets conforming to rules, and correcting packet information in compliance with the rules, etc.

The Ethernet is utilized as an inexpensive network medium. Up until the mid 1990's, the speed of the Ethernet was a comparatively slow 10 Mbps, (Megabit per second) to 100 Mbps so that software processing utilizing a general-purpose processor was sufficient for packet processing. However, in the latter 1990's, the Ethernet speed increased to high speeds from 1 Gbps (Gigabit per second) to 10 Gbps. To process packets at these speeds, the network equipment utilized ASIC, as well as dedicated network processors designed solely for packet processing.

As network interface speeds increase, the time available for processing one packet is becoming shorter. Multiple processors (packet processing engines) are built into the network processors, and, by processing the packets in parallel, they obtain a processing time for each packet and improve the packet throughput. However, raising the network processor throughput and utilizing even faster high-speed network interfaces requires techniques to increase the number of packet processing engines inside the network processor. Using more packet processing engines makes the network processor size excessive and causes an increased power consumption.

Whereupon, a technology was proposed in JP-A No. 048730/2003 for expanding the cache memory, instead of increasing the number of internal packet processing engines, recording the processing results of the packet processing engine group in a cache referred to as a process cache, and providing network processor architecture for utilizing the process-cache contents for packets that can be handled with identical processing. This network processor architecture or architecture conforming to it hereinafter will be referred to as a cache-based packet processor. Packets possessing identical header information, for example, information where the source address and destination address are paired together in the header information, are prone to appear in large numbers within a short time (temporal locality) in the packet flow (traffic) on the network. Therefore, the cache-based packet processor is assumed to operate with comparative efficiency on middle mile networks positioned between the edge and the core of the network, and access networks and edge networks are positioned near the boundary of networks, where the extent of mixing in the packet flow is comparatively light.

When configuring network equipment from cache-based network processors, the cache-hit rate drops according to the arrival sequence of the packets, so that the throughput of the entire network equipment is likely to drop. More specifically, in some cases, a group made up of a large number of packets possessing identical headers will arrive within a short time, and registration of the initial packet in the cache is not completed before the arrival of the following packets.

Packet scheduling is required in order to resolve the above-mentioned problem. The known art contains many effective scheduling techniques. For example, a method is disclosed in domestic announcement No. 2001-519129 for implementing a first level of scheduling that sorts multiple sessions (flows) into classes, and then implements a second level of scheduling to match the several outputs from the first level, and then implements a third level of scheduling by ranking the outputs from the first and second levels in an order of priority. A method is disclosed in JP-A No. 185501/2002 for connecting the output queues and priority-ordered queues in vertical rows, and the priority queue in the prior stage places low priority packets on hold and attaches a mark to them, and, in the latter stage queues, it searches for congestion and, when detected, discards those low priority packets attached with a mark to maintain a fixed bandwidth for each priority level, regardless of fluctuations in traffic volume, so as to effectively utilize the guaranteed bandwidth.

A method is also disclosed in JP-A No. 101637/2000 comprising multiple queues for storing packets, and a scheduler implements transfer bandwidth control, weighting the lead (beginning) packet of each queue per transfer sequence in the order of fastest estimated transfer completion time. However, this method has the problem in that only a comparatively small number of queues can be mounted in the hardware. A method disclosed in JP-A No. 324471/2003 implements scheduling by arraying multiple processors in parallel and operating by time-sharing, in order to increase the number of mountable queues and achieve highly precise bandwidth control. However, none of the above-described scheduling methods is capable of implementing scheduling to prevent a drop in hit rate in the process cache, which is the problem resolved by this invention. The JP-B No. 346519/2003 application made by the present inventors, discloses a scheduling method in which, for a function block for processing packets missed in the cache, the processor only processes the lead packet in the flow with a cache miss, and cache misses from the second flow onward are held in the function block. However, the scheduling method of packets at a prior stage of accessing the process cache is not described.

SUMMARY OF THE INVENTION

The present invention has the object of providing a technology to prevent a drop in the hit rate dependent on the packet arrival sequence by managing input traffic from the network or switch fabric and utilizing a cache, called a process cache, for holding packet processing results to achieve high-speed packet transfer processing; and, consequently, the present invention also has an object to prevent a drop in network equipment performance by utilizing process-cache technology.

By producing a hit state in the process cache as much as possible, the operating rate of the packet processor that is utilized during process-cache misses can be reduced, and the power consumption can be lowered.

The present invention provides a technology for preventing a drop in the process-cache-hit rate by supporting a technology called a process cache for high-speed transfer processing and for managing network traffic while avoiding the use of giant-sized network processors. In this process-cache technology, a cache for recording processing results for received packets is installed in the cache-based packet processor. The packet group is sorted according to rules established by the user, and just the beginning packet in the sorted packet group is processed by a processor built internally into the cache-based packet processor. These processing results are recorded in the process cache, and results recorded in the process cache are promptly applied to the received packet thereafter in packets that are judged to have been received from an identical flow. This operation reduces the processing (load) on the processors built into the network processor and improves the packet processing speed of the network equipment.

In order to manage network traffic, the present invention contains a process-cache tag for holding tags of the process cache in the pre-stage of the process cache, and a function block for holding FIFO (First In First Out) queues corresponding to each entry for the tag. In the traffic management section, packet groups judged to be from the same flow are stacked in the same FIFO queue in their order of arrival. Each FIFO queue records the registration status of the corresponding process cache. When a packet arrives at an FIFO queue of an unregistered entry in the process cache, just the lead packet is conveyed to a function block for processing of process-cache misses and awaits registration in the process cache. At the point where registration of the second and subsequent packets has been completed in the process cache, the process cache is accessed from the FIFO queue. This operation allows process-cache access for packets other than the lead (beginning) packet so that a cache hit can always be achieved.

This technique prevents a drop in the cache-hit rate that is dependent on the process-cache packet arrival sequence. Also, while holding the second and subsequent packets, the lead packet of packet groups determined not to be from the same process flow can also be conveyed to the function block for cache-miss processing. This operation allows effective utilization of built-in processor resources by parallel processing of packets belonging to different flows.

In a more detailed description of the packet processing method of this invention utilizing a cache memory, processing results for the lead (beginning) packet are recorded in the cache memory, and the contents of the cache memory are utilized to process subsequent packets with the same processing as the lead packet in a cache-based processing method comprising: a step to receive a packet; a step to sort the received packet into a flow; a step to record a flow-sorted packet per flow in an FIFO queue that maintains the packet arrival order sequence; a step to process the specified packet and store the processing results in a cache memory when the specified packet of the flow in the queue is not registered in the cache, and to cause packets subsequent to the specified packet in the same queue to wait in the queue; and a step to effect processing of those packet that were made to wait in the queue, after completing the storage into the cache memory of processing results relating to the specified packet.

In this operation, the lead packet of each flow is processed to catch up and pass packets waiting in other flows so that the overall throughput is improved.

More specifically, the processing may also be configured so that each queue contains a corresponding cache, and comprises: a step for each queue to record the registration information of the corresponding cache; and a step for processing only the first packet and awaiting the registration of the processing results in the cache when the packet arrives at an unregistered queue in the cache; and wherein the processing is started at the point in time that registration of the second and subsequent packets into the cache is completed.

The network equipment of the present invention includes an input interface for receiving a packet; a packet parser for analyzing and sorting the received packets and generating a flow for each type; a traffic manager for holding and managing the generated flows in their packet arrival sequence for each type; a packet processing engine for processing the packet; and a process cache for registering the processing results of the packet processing engine in each flow, characterized in that:

(1) processing results in the process cache for a first packet of an unregistered first flow are processed in the packet processing engine;

(2) packets subsequent to the first packet of the first flow are made to wait (standby) until processing results from the first packet are registered in the process cache, and, after registration, are processed using the cache information; and (3) the flow is controlled by processing the second flow packets prior to is the waiting packets, in the period in which packets subsequent to the first packet of the first flow are waiting (in standby).

More specifically, the traffic manager contains a queue for holding and storing internal processing information strings matching the generated flow per each flow type in the order the packets are received, and the internal processing information strings contain registered information showing whether or not the corresponding packet processing results are registered in the process cache. The traffic manager controls the sequence in which packets are sent to the processor by utilizing this registered information, and it regulates the flow.

The pre-stage of the packet processor (or processing engine) preferably contains a parser for selecting whether to process packets in the packet processor or to perform processing after searching the process cache.

A cache-miss handler can be installed to inform the traffic manager that registration of the applicable processing results in the process cache has been completed, when processing of packets in the packet processor was selected by the parser. The traffic manager can register information to the internal processing information string based on a notification from the cache-miss handler. In this way, the traffic manager can control the flow while searching the registered information that has been added to the internal processing information string.

The first packet of the first flow may be the lead (beginning) packet of the first flow. The packet of the second flow may be an unregistered lead (beginning) packet according to process results in the process cache or a registered subsequent packet according to process results in the process cache.

Utilizing the traffic manager of this invention in network equipment possessing a packet processor utilizing a cache, such as a cache-based network processor, produces the effect that a drop in the cache-hit rate dependent on the process-cache packet arrival sequence can be prevented, and, consequently, a drop in throughput in the network equipment can be avoided.

Utilizing the traffic manager of this invention produces the effect that the operating rate of the processor that processes packets when a cache-miss occurs can be reduced by preventing a drop in the cache-hit rate, and the power consumption can be lowered.

BRIEF DESCRIPTION OF THE DRAWINGS

FIG. 16 is a block diagram showing when the packet processor for the cache-based packet processor is separated from the cache-based packet processor.

DETAILED DESCRIPTION OF THE PREFERRED EMBODIMENTS

Various embodiments of the present invention will be described hereafter in detail.

First Embodiment

Figure 1:
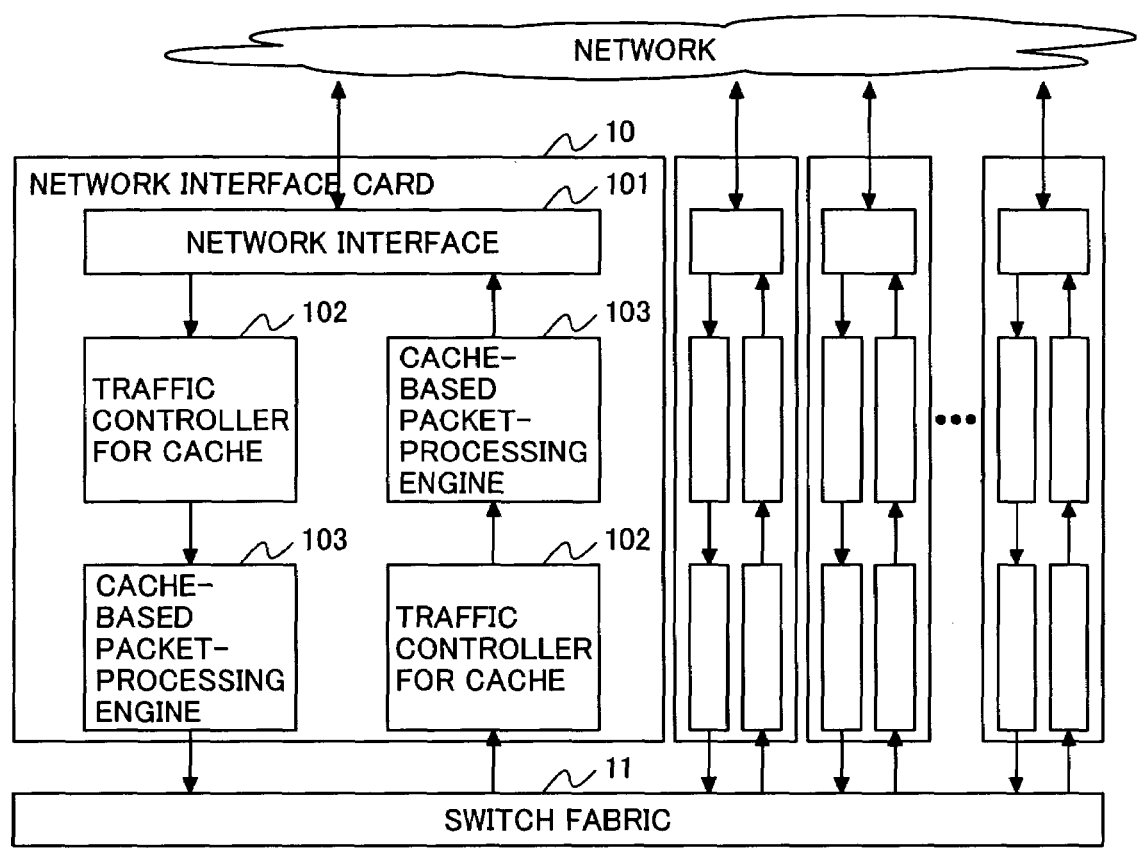
FIG. 1 is a block diagram of the network equipment including a cache-based packet processor and a traffic controller for caches according to a first embodiment of this invention.

FIG. 1 is a block diagram of network equipment in accordance with the present embodiment.

In this embodiment, the network equipment is comprised of a network interface 101 for sending and receiving packets from the network, a traffic controller 102 for the cache for controlling the network traffic, a cache-based packet processor 103, a network interface card 10 containing the elements 101, 102, 103, and a switch fabric 11 for coupling multiple network interface cards 10 and for exchanging packets. Also included are interfaces between host processors and host processors for centralized control of path information between the multiple network interface cards 10.

An overall description of the packet processing operation and its effect in this embodiment will be described next. The packet processor (or packet processing engine) receives the packets from the network interface 101, and the cache traffic controller 102 separates the packets into groups called flows, and records packets of each flow into an FIFO cache in order to maintain the packet arrival sequence. First of all, only the lead packets of each flow that are not registered in the cache-based packet processor 103 are conveyed to the cache-based packet processor 103, and the second and subsequent packets of each flow are held in an FIFO type queue. The lead packet of each flow overtakes the second and subsequent packets of other flows and can be conveyed to the cache-based packet processor 103. The second and subsequent packets are conveyed to the cache-based packet processor 103 after notification of completion of cache registration.

The above-described operation of the cache-based packet processor 103 can achieve cache hits for all packets, except the lead packet of the flow. In other words, the effect is such that a drop in the cache-hit rate dependent on the process-cache packet arrival sequence can be prevented, and, consequently, a drop in throughput in the network equipment can be avoided.

The cache-based packet processor 103 possesses one or more processors and a cache memory, called a process cache, for storing program processing results of all processors. The lead packet of the flow utilizes processors to implement a path search to acquire packet destination address information, and, if necessary, to implement other operations, such as filtering information, acquisition for determining whether or not a packet can pass, or acquisition of header information such as MPLS (Multiprotocol Label Switching) or VLAN (Virtual Local Area Network). Results from these operations are set as an information string applicable to packets just by a bit string operation using dedicated hardware or a simple processor, and are registered in a process cache, and the packet is conveyed to sections that perform post-stage processes. The second and subsequent packets in the flow achieve a hit in the process cache, and so they bypass handling in the processor utilizing the process-cache contents, and the packets are conveyed to sections that perform post-stage processes. In these post-stage sections, the necessary processing is implemented on the packet by dedicated bit string operation hardware, and the packet conveyed to the switch fabric 11 and processing for the applicable packet then ends. Generally, the higher the operating rate of the processor, the greater will be the rise in power consumption. The cache-based packet processor 103 contains one or more processors for processing a packet, but since the processor need only process the lead packet miss in the process cache, in accordance with this invention, the power consumption can be reduced by preventing a drop in the cache-hit rate. The power consumption rises in the cache traffic controller 102 of this invention, but in view of the fact that it is used in place of the traffic manager described later on, the rise in power consumption in the cache traffic controller 102 is seen as equivalent to the traffic manager and can be ignored.

The switch fabric 11 sends the packets received from each network interface card 10 to a designated destination address for a network interface card 10. The packet conveyed from the switch fabric to the network interface card 10 is sent to the network, and it passes through the cache traffic controller 102 and the cache-based packet processor 103 in the same way.

The cache traffic controller 102 of this invention resembles a device called a traffic that is manager utilized in network equipment of the related art in the respect that it manages network traffic. However, the cache traffic controller 102 of the present invention is significantly different in terms of how control is implemented.

Figure 2:
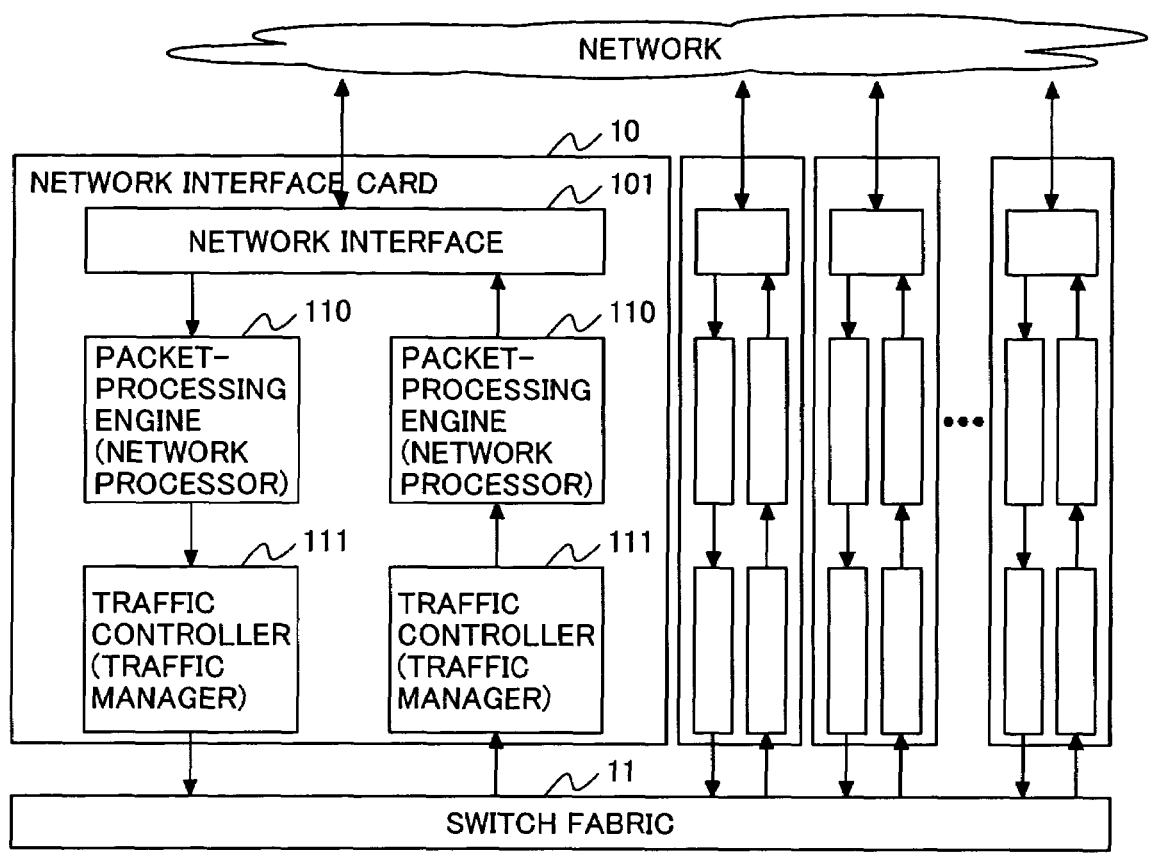
FIG. 2 is s a block diagram of an example of the network equipment including a packet processor and a traffic controller of the related art.

First of all, the traffic manager will be described. The traffic manager is a device that operates to monitor the band for inputs outside a specified range, and, if greater than the specified band, to perform handling to discard that input or shaping to limit the output to within the specified range, and to adjust items such as the scheduling according to the priority sequence in the flow order. As shown in FIG. 2, network equipment utilizing the traffic manager is made up of a network interface 101 for sending and receiving packets from the network; a packet processing engine 110 (or ASIC conforming to it) serving as the packet network processor; a traffic manager 111 (or ASIC conforming to it) for controlling traffic; a network interface card 10 including the elements 101, 110, 111; and a switch fabric 11 for coupling the multiple network interface cards 10 and for exchanging packets. Also included are interfaces between host processors and host processors for centralized control of path information between the multiple network interface cards 10.

The decisive difference between the cache traffic controller 102 of this invention and the traffic manager of the related art will be described next. The cache traffic controller 102 of the present invention is different from the traffic manager of the related art in that it controls input traffic so that packets other than the lead packet in the flow achieve access for a hit in the process cache. Also, the installation position, which is from the network input on the side towards the switch fabric, is different when configuring the network. The traffic controller (traffic manager) is usually installed in the post-stage of the packet processor, such as an ASIC or the packet processing engine (network processor), however, in accordance with this invention, the traffic controller for cache (cache traffic controller) is installed in the pre-stage of the cache-based network processor or ASIC, etc. In this embodiment, the cache traffic controller 102 is provided in a stage (pre-stage) prior to the cache-based packet processor 103. These installation positions are for carrying out packet flow control prior to accessing the cache.

Figure 3:
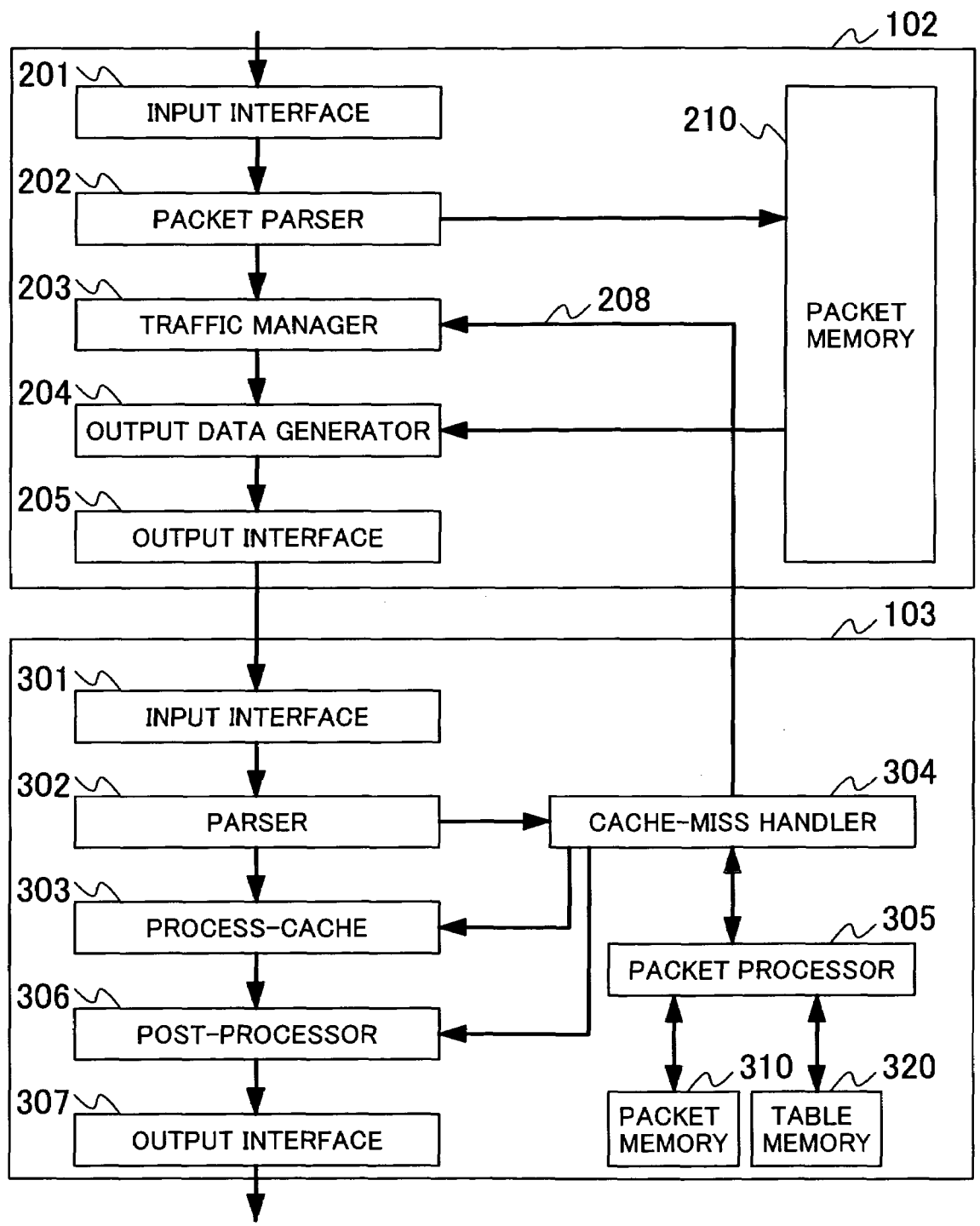
FIG. 3 is an internal block diagram of the cache-based packet processor and a traffic controller for caches in the first embodiment of this invention.

The internal structure of the cache traffic controller 102 and the cache-based packet processor 103 are shown in FIG. 3, and the packet processing operation thereof will be described. Although the cache traffic controller 102 and the cache-based packet processor 103 can be integrated onto the same chip, they may also be mounted on a single chip and may be mounted on respectively different chips. In FIG. 3, the cache traffic controller 102 and the cache-based packet processor 103 are assumed to be mounted on separate chips.

As one example, the cache traffic controller 102 may be comprised of an input interface 201, a packet parser 202, a traffic manager 203, an output data generator 204, an output interface 205, a process-cache registration signal line 208, and a packet memory 210. The structural elements of the cache traffic controller 102 are preferably mounted on a single chip in order to achieve low latency and high-speed packet processing. The packet memory 210 is preferably mounted on the same chip, utilizing a high-speed and high-density on-chip memory, such as an embedded DRAM (Dynamic Random Access Memory) or 1T-SRAM (1 Transistor Static Random Access Memory), however, all or a portion of the packet memory 210 may also be mounted outside the chip.

Figure 4:
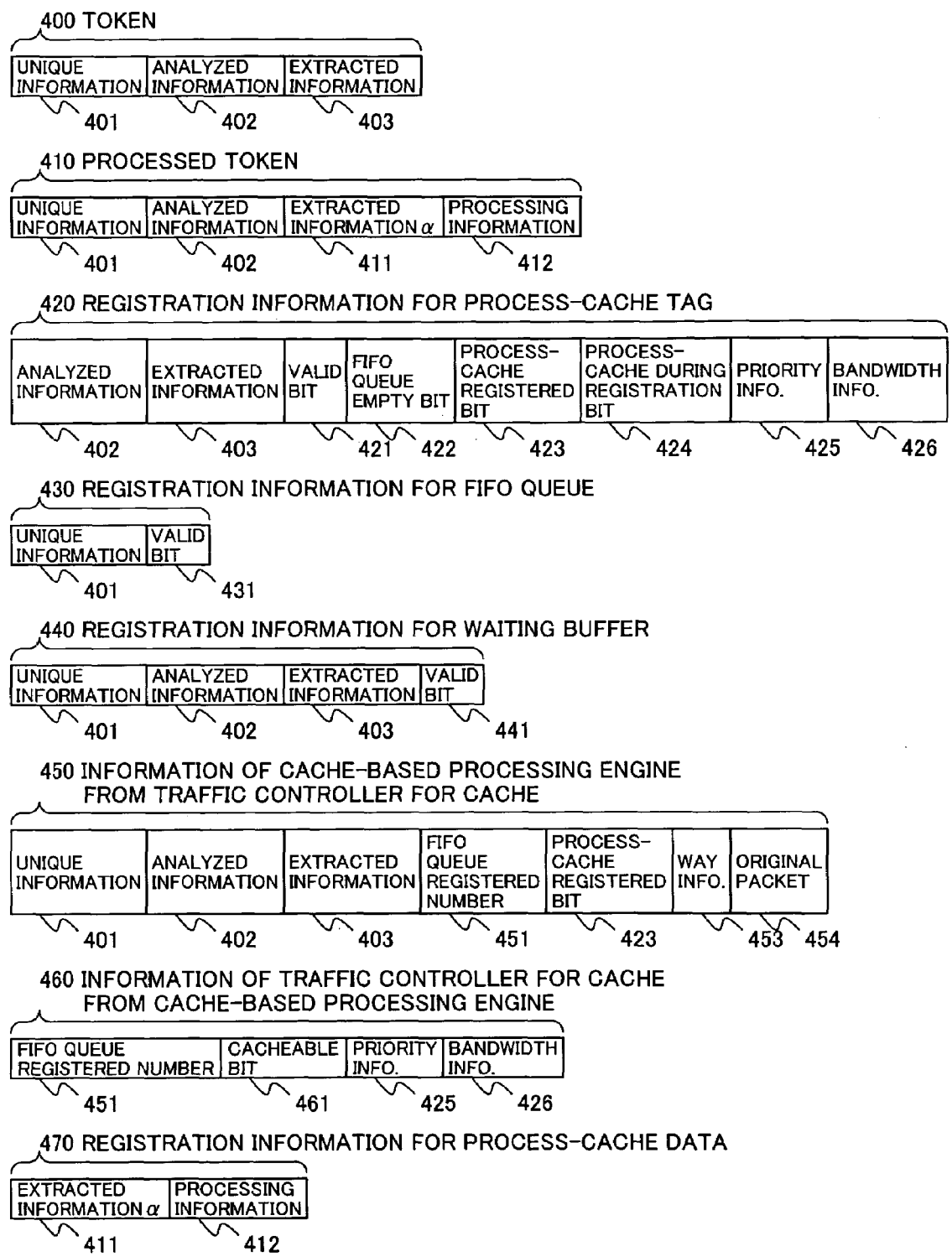
FIG. 4 is a diagram showing the data formatting list used in the internal sections of the traffic controller for caches and the cache-based packet processor.

After the cache traffic controller 102 receives a packet from the input interface 201, the packet parser 202 analyzes the packet, and it generates an information string exclusively for internal processing. This information string used exclusively for internal processing is here called a token. The source (original) packet is stored in the packet memory 201. An example of the structure of the token 400 is shown in FIG. 4. The token 400 contains unique information 401, analyzed information 402, and extracted information 403.

The unique information 401 is information unique to each packet, and it is utilized for distinguishing one token from another. Packet storage addresses for the packet memory 210 are given as an example, to allow identifying each token by means of those packet storage addresses. Information, such as packet size and packet fragment information, error information revealed in packet analysis results, and TCP control information may also be included, for use in packet processing. For example, when multiple flows can be sent from the cache traffic controller 102, then the flow to be output can be selected by utilizing the packet size as one segment of the QoS (Quality of Service) to be described later on. Also, the FIN and RST bits in the TCP control bit can be used to show that the token is for the final packet of the flow; and, after that token has passed, it can be utilized to clear the process-cache entry and the FIFO queue entry.

The analyzed information 402 is information relating to the protocols and transferring utilized in each network layer of the packet. The analyzed information 402 indicates protocols utilized in layer 2, layer 3, layer 4 and layers 5 through 7 (for example, MPLS or VLAN utilized in layer 2, IPv4 or IPv6 utilized in layer 3, TCP utilized in layer 4, and HTTP utilized in layer 7, etc.) and packet transfer information in layer 2 (unicast, broadcast, or multicast). The notation format in the analyzed information 402 for the protocol type being used may be the format contained in the actual packet header (for example, the layer 2 type field itself) and the number of types may be limited when judged necessary (for example 16 types), and may even be an encoding format for those types (for example, four bits may be encoded in the case of 16 types). A program stored in the instruction memory within the packet parser 202 can specify up to what layer to analyze to generate the analyzed information 402. Therefore, a flexible response can be made for a layer 2 switch, a layer 3 switch, a layer 4 switch, and a layer 7 switch according to the configuration for use.

The extracted information 403 is a portion of the header information extracted from the packet. The destination IP address and the source IP address for an IPv4, for example, can be extracted as layer 3 extraction information. In another example, the TCP destination port number and the TCP source port number of layer 4 can be extracted in addition to the above-mentioned layer 3 extraction information. The extracted contents can be changed by rewriting the program stored in the instruction memory contained in the packet parser 202, the same as for the analyzed information 402.

The extracted information 403 and the analyzed information 402 for the token 400 are utilized for deciding if two particular packets belong to the same flow or belong to different flows. When these two packets are compared and the respective sets of analyzed information 402 and the extracted information 403 are the same, then the two packets can be judged to belong to the same flow. On the other hand, when these two packets are compared and the respective sets of the analyzed information 402 and the extracted information 403 are different, then the two packets can be judged to belong to different flows.

Figure 5:
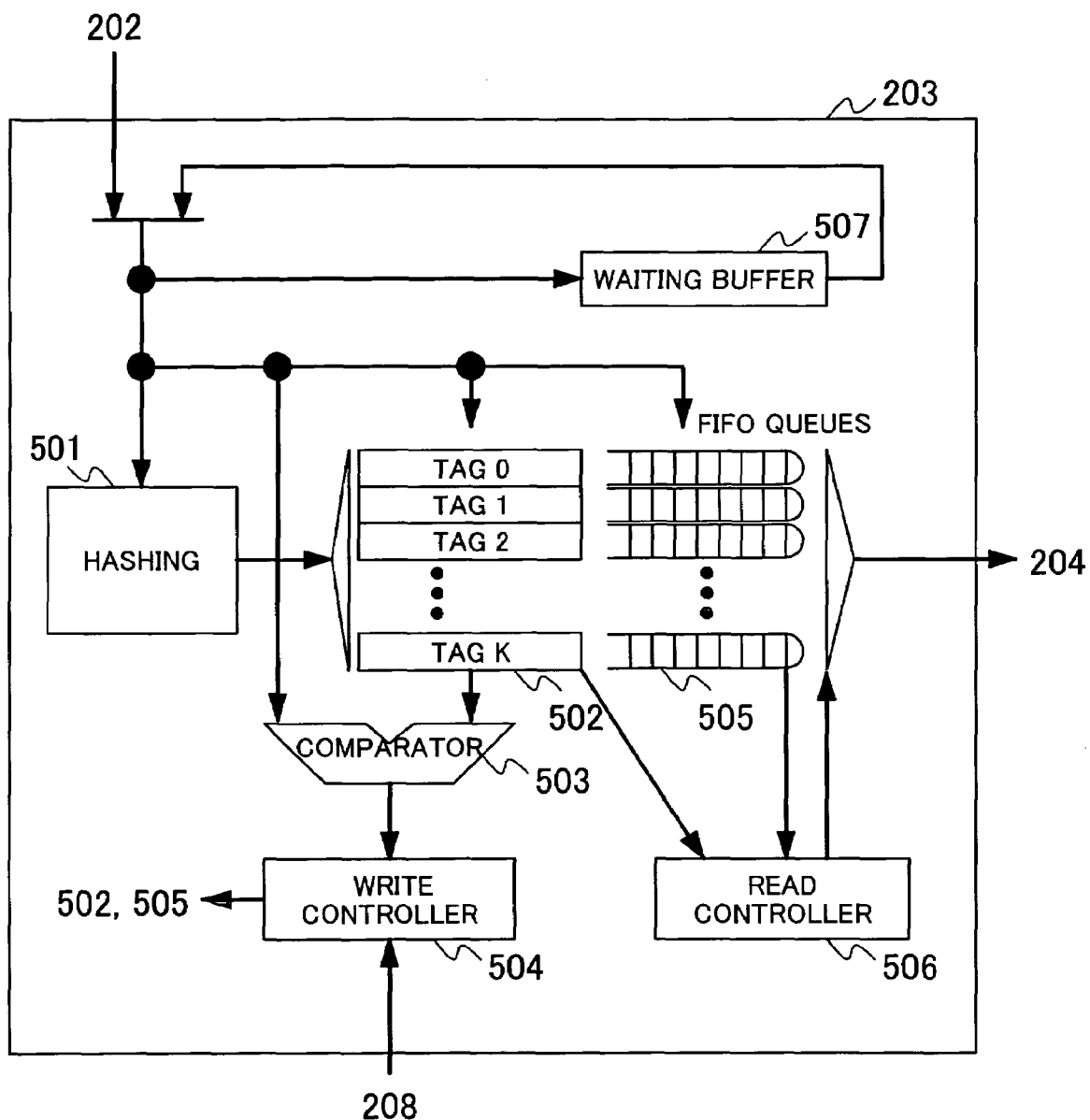
FIG. 5 is a block diagram of the traffic management section of the traffic controller for caches for implementing the direct mapping method.

The traffic manager 203 performs the sorting and managing so that the token 400 generated by the packet parser 202 will be in a state separated into flows. An example of the internal structure of the traffic manager 203 is shown in FIG. 5. The traffic manager 203 is made up of a hashing 501 (or hash section), a tag (section) 502, and a FIFO queue 505, a comparator 503, a write controller 504, a read controller 506, and a waiting buffer 507.

In order to prevent the second and subsequent packets of the flow from missing the process cache, the traffic manager 203 must know the process-cache status, or, in other words, must know if the applicable token is registered in the process cache (hit state), or if it is not registered therein (miss state). Therefore, in order to know the process-cache status, the traffic manager 203 includes a tag (section) 502 that is equivalent to the tag in the process cache. The tag (section) 502 holds the extracted information 403 and analyzed information 402 of the token. The access key for searching the tags is generated by applying a hash to all of the extracted information 403 and analyzed information 402 by utilizing the hashing (hash section) 501. The hashing 501 utilizes the same algorithm as the hashing 511 contained in the process cache 303 of the cache-based packet processor 103. There are various techniques to implement the hash, but the method, for example, utilizing the excellent randomizing capability of a CRC (Cyclic Redundancy Check) operation is preferable for linking to improve the hit rate to make entry conflicts less prone to occur in the cache. Whether or not the token is a hit in the process cache can be determined by using the comparator 503 to compare the tag contents output after searching the tag 502, with a pair of the analyzed information 402 and extracted information 403 for the token being utilized for access.

In order to control the packet flow to the cache-based packet processor 103, the traffic manager 203 contains an FIFO queue 505 at each tag 502 entry for controlling the arrival sequence of tokens per each flow. An example of the registration format onto the tag 502 is shown at 420 in FIG. 4, and an example of registration onto the FIFO queue 505 is shown at 430 in FIG. 4.

The registration information for the tag 420 holds a valid bit 421 for showing that the entry is being used, as well as the analyzed information 402 and extracted information 403 of the token, as tag equivalent information for the process-cache tag. The registration information for the process-cache tag 420 also contains an FIFO queue empty bit 422 for showing that the token is not in the entry of the corresponding FIFO queue 505, and a process-cache-during-registration-bit 424 for showing the current registration request output to the process cache, and a process-cache-registered-bit 423 for showing that process cache registration is completed. The (process-cache) tag 420 further contains priority information 425 for showing the priority of the applicable flow, and bandwidth information 426 for showing the usable bandwidth allowed in the applicable flow in cases where QoS control is implemented in each flow.

The registration information for FIFO queue 430 is made up of a valid bit 431 for showing that the entry is being used, and a unique information 401 for tokens.

The number of FIFO queues 505 is the same as the number of entries K for the process cache. For example, when the process cache utilizes 4,000 entries, then there are 4,000 FIFO queues. The FIFO queues 505 may be provided in separate memories, or they may be included in memories containing all or a portion of the FIFO queues.

The write control operation for writing on the tag 502 and the FIFO queue 505 will be described next. The token searches the tag 502 by way of the hashing 501, as described above, judges whether a hit occurs in the process cache and notifies the write controller 504. If there is a hit, then the write controller 504 writes the unique information 401 of the token in the corresponding FIFO queue, and sets a value (for example 0) to show that the FIFO queue empty bit 422 is not empty.

If there is a miss in the process cache, then the applicable analyzed information 402 and extracted information 403 of the token are registered in the tag 502 of the corresponding entry, and the unique information 401 of the token is registered in the corresponding FIFO queue 505. A value (for example 1) is set in the process cache during registration bit 424 to show that registration is in progress.

The read out control of the tag 502 and the FIFO queues 505 will be described next. The read controller 506 monitors the process-cache-registered-bit 423, as well as the process cache during registration bit 424 and the FIFO queue empty bit 421, for each FIFO queue of tag 502. Read out of the FIFO queues 505 is carried out in the following two cases.

(1) The first case is when there is a lead (beginning) packet of the flow, or, in other words, an unregistered packet in the process cache. In this case, the process-cached-registered-bit 423 shows a value (for example 0) indicating non-registration, and the process cache during registration 424 shows a value (for example 0) indicating there is no registration, and the FIFO queue empty bit 422 shows a value (for example 0) indicating that it is not empty.

(2) The second case is when there are second and subsequent packets in the flow, in other words, a registered packet in the process cache. In this case, the process-cache-registered-bit 423 shows a value (for example 1) indicating registration, and the value shown in the process cache during the registration bit 42 is ignored, and the FIFO queue empty bit 422 shows a value (for example 0) indicating it is not empty.

If the entry corresponds to either of states (1) or (2) above, then the unique information 401 registered in the corresponding FIFO queue 505, and the analyzed information 402 of the tag 502, and the extracted information 403 are read out and returned to the token, and this information is conveyed along with the registration FIFO queue number 451 (also corresponding to entry No. of tag 502) to the output data generator 204. Packets possessing the flow state of (1) or (2) can overtake (or pass) packets of a different flow state (2). Basically, entry registration in the process cache can be achieved at an early stage by conveying tokens to the output data generator 204, while giving priority to tokens with an entry state of (1).

If the memory capacity is sufficient, not only the unique information 401, but also the analyzed information 402 and the extracted information 403, may be recorded in the FIFO queue 505. Also, when the FIFO queue 505 that was read becomes empty, then the corresponding queue information 430 can be deleted, and a value (for example 1) is set to show that the FIFO queue empty bit 422 of Registration information for (process-cache) tag 420 is empty.

Tokens accumulate in the multiple FIFO queues 505 of FIG. 5, and the state where tokens can be sent from the multiple FIFO queues 505 will be described next. When this state occurs (tokens accumulate), the FIFO output method for extracting tokens from the applicable FIFO queue 505, in the order that a value (for example, 1) in process-cache-registered-bit 423 shows that registration is complete, or the RR (Round Robin) method in which each token or multiple tokens are sequentially changed in their order of extraction, are simple to use. However, the priority information 425 of the process-cache tag 420 can be used along with various output methods of the related art to establish a difference in service between high priority flows and low priority flows. For example, PQ (Priority Queuing) can be achieved by adding K type (for example; the four types: High-Middle-Normal-Low) priority information to the priority information 425. The WFQ (Weighted Fair Queuing) method can be applied so that during extraction, the source (original) packet size for the token is identified from the unique information 401 and, for example, the sum of the packet sizes output from the FIFO queue 505 that are output candidates among cycles set as the threshold are then weighted fairly.

The packet size contained in the token unique information 401 and bandwidth information 426 of the Registration information for (process cache) tag 420 may be utilized to send tokens from the FIFO queue 505 up to the preset band. For example, to handle the CBR (Constant Bit Rate) service class in the ATM (Asynchronous Transfer Mode), when an output is allowed from the applicable FIFO queue 505, the applicable FIFO queue 505 can take (occupy) an output path to the cache-based packet processor 103 in the period just equivalent to the value specified in the band information 426, and the token conveyed on that output path is conveyed to the next FIFO queue 505. In order to handle the rt-VBR (Real Time Variable Bit Rate) service class in the ATM, when an output from the applicable FIFO queue 505 is allowed, if there is a token in the applicable FIFO queue 505 even after the period equivalent to the value specified in the band information 426 has ended, then an output path can be taken (occupied) to the cache-based packet processor 103. In order to handle the nrt-VBR (Non Real Time Variable Bit Rate) service class in the ATM, when an output from the applicable FIFO queue 505 is allowed, if there is a token in the applicable FIFO queue 505 even after the period equivalent to the value specified in the band information 426 has ended, then an output from the FIFO queue 505 can be sent, in the period up to the value additionally specified in the band information 426. The above-described operation can also be performed with other service classes.

The hashing 501 in FIG. 5 applies hashing to tokens in order to concentrate an infinite number of packet flows into a certain number of process-cache entries, and, consequently, a situation occurs where different flows are assigned to the same process-cache entries. The structure shown in FIG. 5 is the direct mapped method structure in which the assigned positions of the tag 502 are all decided by the value obtained from the hashing. This direct mapped method is easy to install and has the advantage of high-speed, since no selection logic is required for read-out. However, the direct mapped method is prone to a state where tokens belonging to different flows are assigned to the same entry and, therefore, is disadvantageous in terms of boosting the cache-hit rate.

Figure 11:
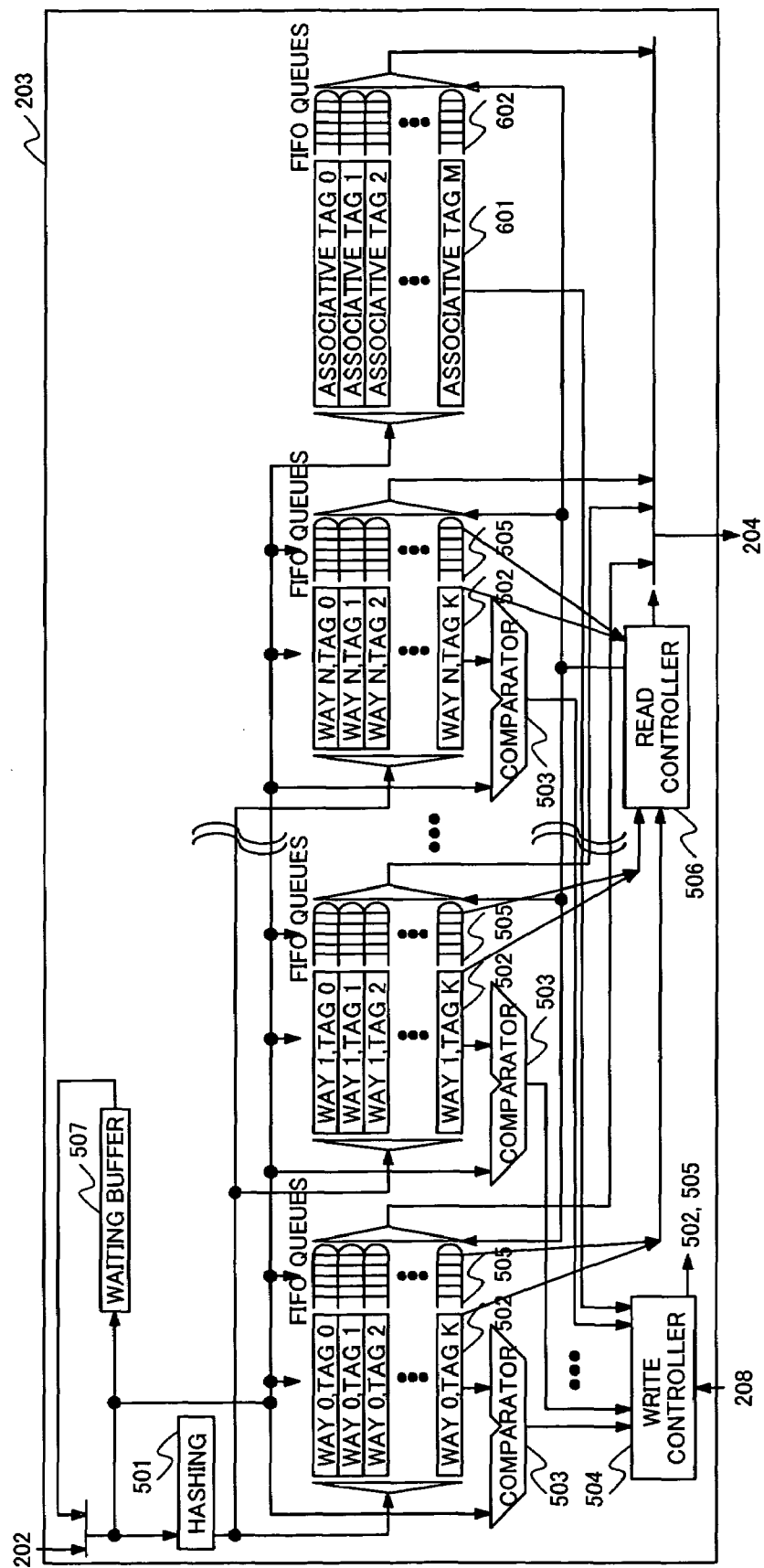
FIG. 11 is a block diagram showing when the tag for the M entry—fully associative type cache traffic controller and the FIFO queue section have been added to the tag for the N weight & set associative cache traffic controller section and the FIFO queue section.

Therefore, in order to obtain a cache hit, even if tokens are assigned to the same entry, the (N-way) Set Associative method provides N positions to the tag and FIFO queue. As shown in FIG. 11, the (N-way) Set Associative method is capable of increasing the positions assigned by values acquired from the hashing, to up to N positions. When the FIFO queue and tag of the (N-way) Set Associative method are used, and there is an unregistered way after applying the hashing to the token, then the token is registered onto a yet unregistered way. If all the N positions have already been assigned, then a desired way can be selected and overwritten (onto one of these positions). Algorithms, such as the LRU (Least Recently Used) algorithm for selecting the latest non-used entry, or the FIFO (First In First Out) algorithm for selecting the oldest entry, may be utilized to select a desired way, the same as when utilizing a cache with a normal processor, so that the information registered in the cache can be used as effectively as possible. An N! (factorial of N) bit must be used at each entry in order to accurately utilize the LRU algorithm, and the Log 2N bit information is required at each entry in order to accurately utilize the FIFO algorithm.

In both the direct mapping method and the (N-way) Set Associative method, the case occurs where different flows request the same entry, as well as the case where the corresponding entries are all being used. When these situations occur, the token registration is controlled by utilizing the FIFO queue empty bit 422, the process-cache registered bit 423, and the process cache during registration bit 424 of the registration information for process tag 420 of the applicable entry.

A first case, in which overwriting of the applicable entry by tokens arriving later is allowed, occurs when the entry corresponding to the tag 502 is empty. A second case occurs when a flow is already registered in the entry corresponding to the tag 502, but there is absolutely no token for processing in the corresponding FIFO queue. The first case, in other words, occurs when "the value in the process-cache registered bit 423 for the applicable entry of the tag 502 is a value showing non-registration (for example 0), and further is a value in the process cache during registered bit 424 showing non-registration (for example 0). The second case, for example, occurs when the value in the process-cache registered bit 423 for the applicable tag entry of the 502 tag is a value showing registration (for example 1), and further is a value in the FIFO queue empty bit 422 showing that the FIFO queue is empty (for example 1).

Overwriting of the applicable entry by tokens arriving later is not allowed, in a first case where a flow is registered in the entry corresponding to the tag 502, and further there are tokens for processing accumulated in the corresponding FIFO queue. A second case is where only the first (or lead) packet of the flow is registered in the entry corresponding to the tag 502, and the cache-based packet processor 103 is requested to process that first packet. In other words, the first case is when the value in the process-cache registered bit 423 for the applicable entry of tag 502 shows that registration is completed (for example 1), and, further, the value in the FIFO queue empty bit 422 is a value (for example 0) showing that the FIFO queue is not empty. The second case is, when the value in the process cache during registered bit 424 for the applicable entry of tag 502 is a value (for example 1) showing that registration is in progress.

When overwriting is impossible since the applicable entry tag 502 is in use, just that token which could not be overwritten and subsequent tokens that might cause conflicts on the tag 502 are registered. As shown in 440 of FIG. 4, the content for registration is the valid bit 441 showing that the unique information 401 for the token, the analyzed information 402, the extracted information 403 and the entry are valid. This method does not stop access to token tags 502 of other flows that can be overwritten, and so, it is not likely to lead to a drop in the token processing efficiency. The waiting buffer 507 monitors entries that cause conflicts; and, when a state is reached where overwriting is allowed, it stops the supply of tokens to the tag 502 from the packet parser 202, and the lead tokens with priority from the standby buffer 507 are made to access the tag 502.

When installing the waiting buffer 507 is impossible, the token processing efficiency drops. However, in another embodiment, there is a method for registering tokens that could not be overwritten and subsequent tokens in the waiting buffer 507. The waiting buffer 507 monitors entries that cause conflicts; and, when a state is reached where overwriting is allowed, it stops the supply of tokens from the packet parser 202, and lead tokens that have been given priority from the standby buffer 507 are utilized in searching the tag 502.

The output data generator 204 that has received the token, applies an FIFO queue registered number 451, a process-cache-registered-bit 423 for showing that process-cache registration is completed, a Way Info. No. 453 when setting the later related process cache to the set associative, and the original packet 454 corresponding to this token to the received token 400, in the format 450 of FIG. 4, and conveys it to the output interface 205, where it is sent to the cache-based packet processor 103. If there is a flow in an unregistered state in the process cache, then the process-cache-registered-bit 423 writes a value (for example 0) showing the cache non-registered state, if there is a flow already registered, then bit 423 takes a value (for example 1) showing that cache registration is complete.

The cache traffic controller 102 from hereon waits for notification that registration of the applicable token in the process cache is complete. During this waiting state, registered tokens in the process cache and lead tokens from different flows are sent from the cache traffic controller 102 to the cache-based packet processor 103. The signal 208 is used for the registration complete notification, when process-cache registration is complete, then a value (for example 0) is set in the process cache during registration bit 424 for the corresponding tag 502 entry showing that registration is not currently in progress, and a value (for example 1) showing that registration is complete is set in the process-cache-registered-bit 423, and the second and subsequent applicable FIFO queues can then be issued. Also, if registration in the process cache was impossible for some reason, then the process-cache-registered-bit 423 remains in a non-registered state (for example 0) and the second token of the applicable FIFO queue is again handled the same manner as the first (lead) token.

The structure and packet processing operation of the embodiment of the cache-based packet processor 103 of FIG. 3 will be described next. The embodiment of the cache-based packet processor 103 is made up of an input interface 301, a parser 302, a process cache 303, a cache miss handler 304, a packet processor 305, a post-processor 306, an output interface 307, a packet memory 310, and a table memory 320. The structural elements of the cache-based packet processor 103 are preferably mounted on a single chip in order to achieve low latency and high-speed packet processing. The packet memory 310 and the table memory 320, for example, are preferably mounted on the same chip, with other structural elements for the cache-based packet processor 103, utilizing a high-speed and high-density on-chip memory, such as embedded DRAM or 1T-SRAM, however, all or a portion of the packet memory 310 and the table memory 320 may also be mounted outside the chip.

The interface 301 receives the token and the packet using the format of 450 in FIG. 4. The parser 302 is next utilized to refer to the received token and the process-cache-registered-bit 423 of the packet 450, and if a value (for example 1) showing registration is complete appears in the process-cache-registered-bit 423, then the token and packet are conveyed to the process cache. If a value (for example 0) showing a non-registered state appears in the process-cache-registered-bit 423, then the token and packet are conveyed to the cache miss processor.

Figure 7:
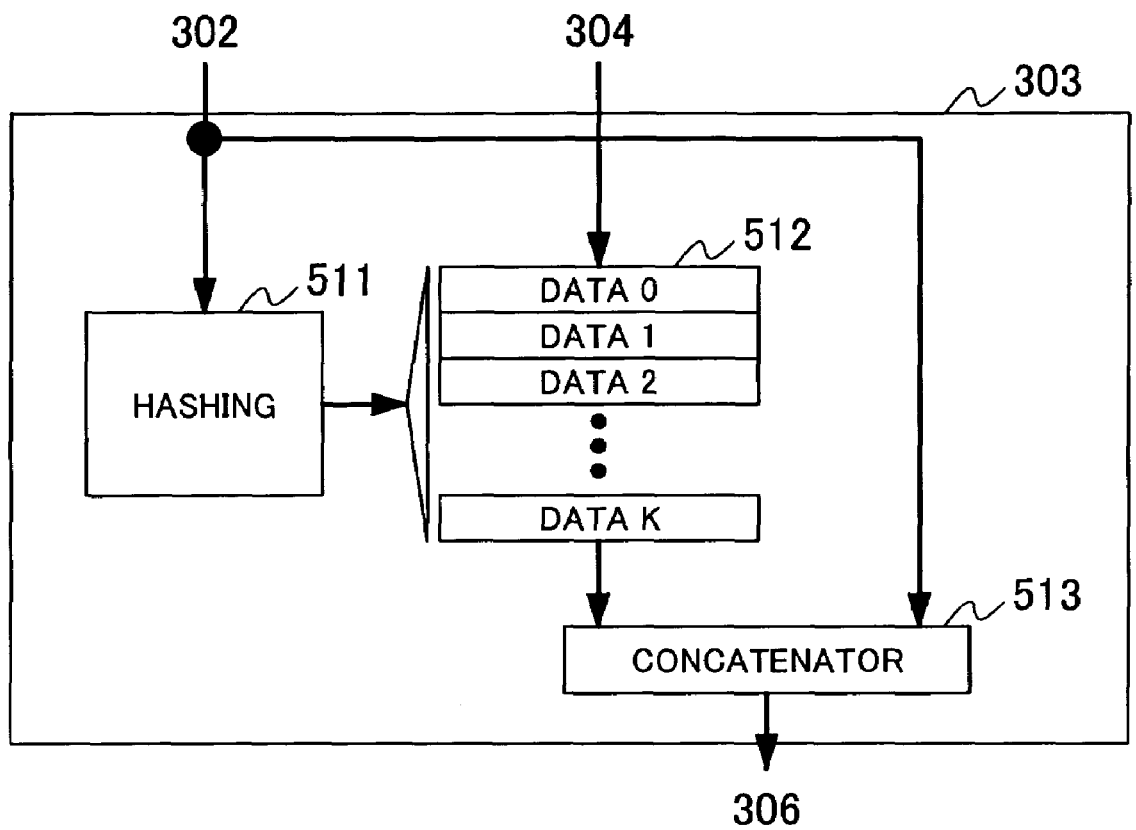
FIG. 7 is an example of the data structure of a process cache of the direct map type cache-based packet processor.

First of all, the processing of a cache-registered token will be described. A cache-registered token is conveyed to the process cache 303 when there is no need to process it in the packet processor 305. One embodiment of the process cache 303, as shown in FIG. 7, is comprised of a hashing 511, a process-cache data 512, and a concatenator 513. In this embodiment, the process cache 303 of the cache-based packet processor 103 need only contain data (section) so that the tag (section) of the process cache can be installed in the cache traffic controller 102. The hashing 511 is utilized for the same hashing as the hashing 501 for distributing the token to the tag 502 of the cache traffic controller 102. The process-cache data 512 holds substitute token information (470 of FIG. 4) comprised of the packet extracted information α411 and the processed information 412 after processing by the processor.

The extracted information α411 is information, such as newly added headers and a rewritten address for use by the packet, and it is generated (in a format) by overwriting the source extracted information 403. If there are no changes, then the extracted information 403 remains unchanged. The newly added header is, for example, a header used for capsulizing, such as of IPv4 and IPv6, MPLS shim headers, VLAN headers, etc.

The processing information 412 is information showing how to apply the token 410 to the original packet. For example the processing information 412 is utilized to show in what position of the packet to place the extracted processing information α411 and the information size, namely, whether to insert or substitute the information or not, or to delete it, or to issue a packet discard command, or to support an address conversion operation, or to specify the output port for the network interface 101 or QoS information and switch fabric 11.

The token searching the process-cache data 512 is already in a state revealing a hit. The substitute token information 470 acquired from this search, the unique information 401 of the token utilized for the search, and the analyzed information 402 generate the packet processing token (410 of FIG. 4) from the concatenator 513, and which is conveyed to the post-processor 306.

Figure 8:
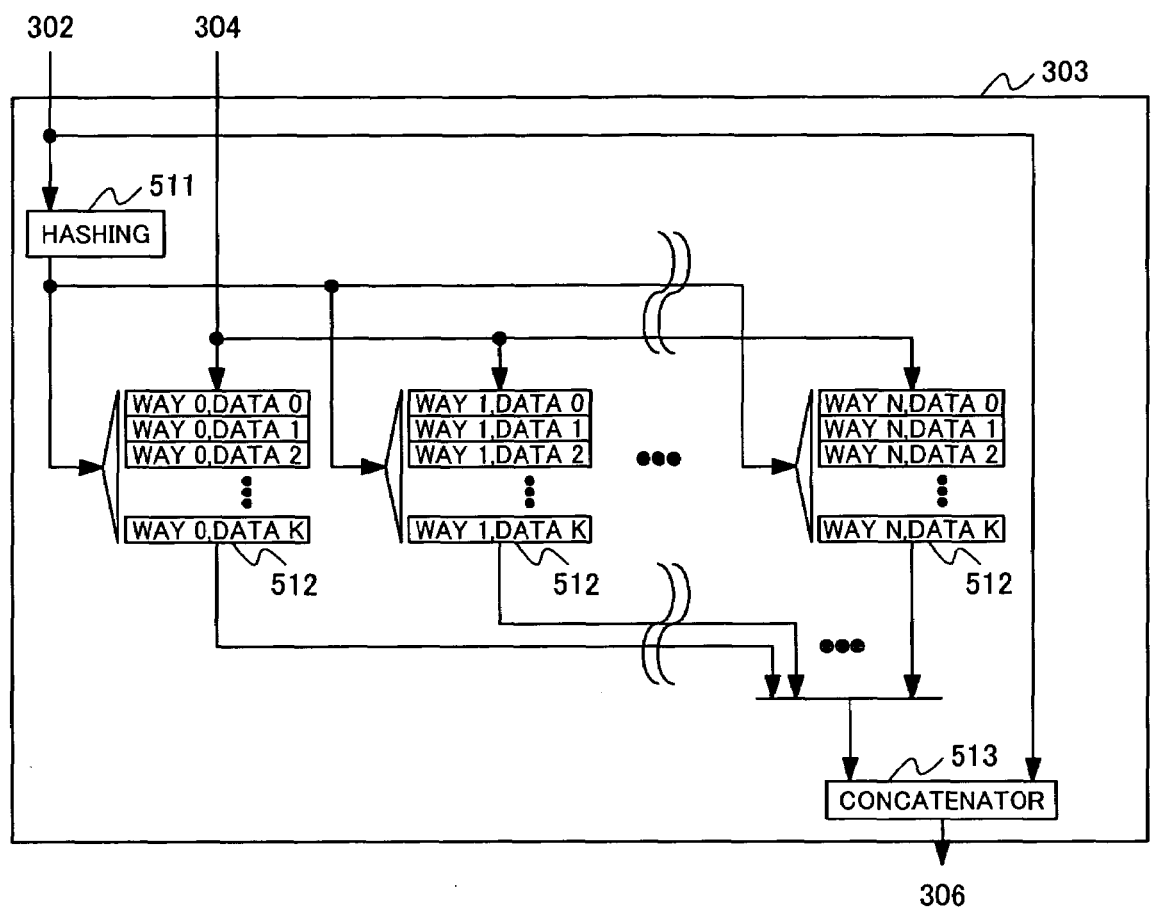
FIG. 8 is an example of the data structure of a process cache of the N-weigh-set-associative type cache-based packet processor.

The process cache of FIG. 7 uses the direct mapping method; however, when the traffic manager 203 of cache traffic controller 102 uses the (N-way) Set Associative method, then the process-cache data section 303 for the cache-based packet processor, as shown in FIG. 8, also possesses an (N-way) Set Associative structure.

Figure 9:
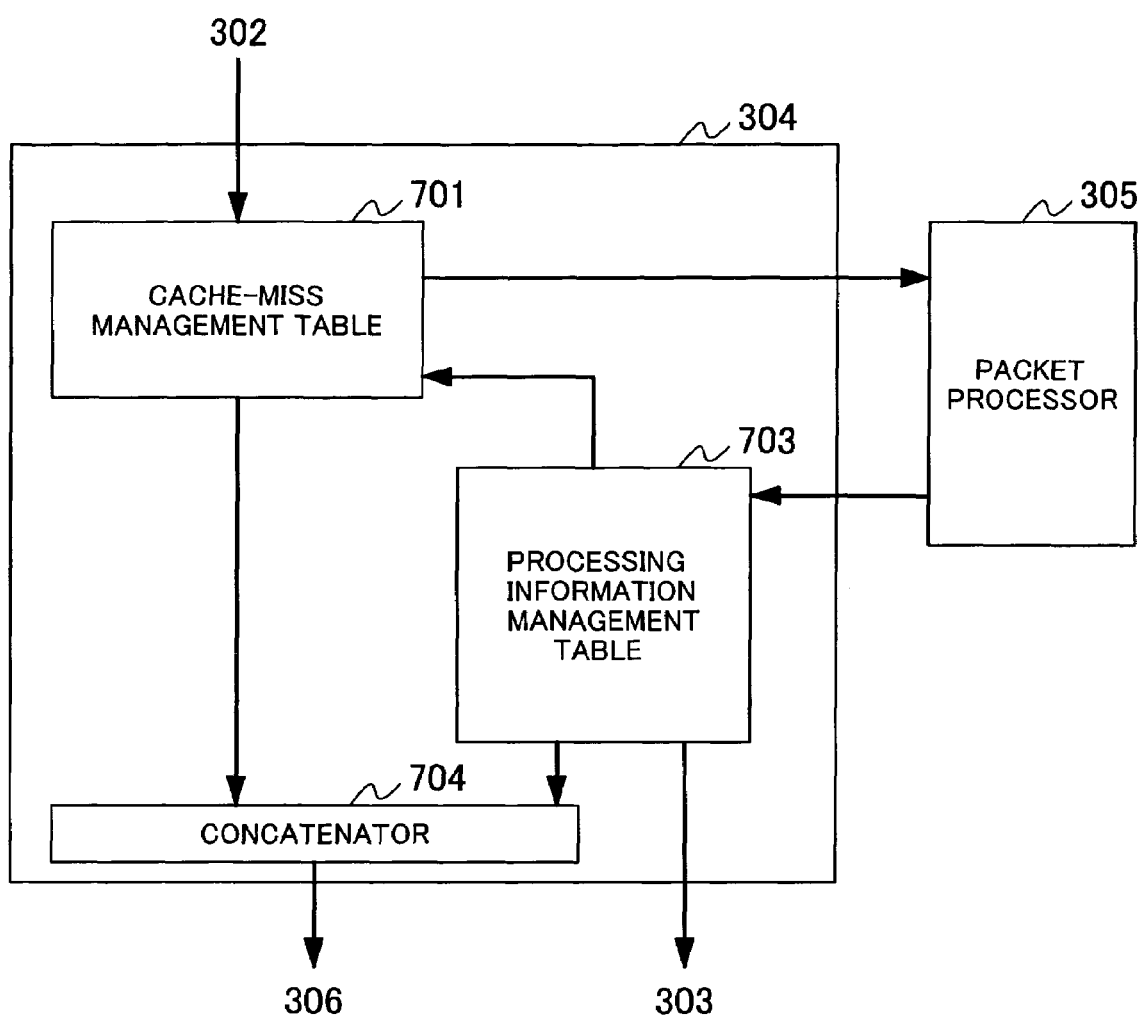
FIG. 9 is a block diagram of the cache-miss management section of the cache-based packet processor.

The processing of a non-registered token in a cache will be described next. A non-registered cache token is required for processing needed in the packet processor 305, and it is therefore conveyed to the cache miss handler 304. An embodiment of the cache miss handler 304, as shown in FIG. 9, is comprised of a cache miss management table 701, a processing information management table 703, and a concatenator 704. The cache miss management table 701 records the unique information 410 of the received token, the analyzed information 402, the extracted information 403, the FIFO queue registration No.451, and the cache Way Info. No. 453, and it conveys the token and the packet attached to it to the packet processor 305.

If necessary, the packet processor 305 records the received token and packet into the packet memory 310. A variety of techniques are available for structuring the packet processor 305. However, a typical method is to integrate multiple processors to receive the tokens and packets one after another so that a high throughput can be maintained by parallel processing with these multiple processors. The processing by the packet processor 305 is that accompanying comparatively long latency memory searches. More specifically, the processing includes a path search for determining the transfer destination of the applicable packet after searching the conversion table stored in the table memory 320, filtering processing for deciding whether or not to allow a packet to pass, encapsule processing for converting the packet format to allow it to be processed by the network equipment at the transfer destination, processing to add, convert or delete MPLS headers, processing to add, substitute or delete VLAN headers, and address conversion, etc. The computing elements in the processor cannot be utilized until the results from the memory search come back, and, therefore, processor utilization efficiency tends to decline. However, techniques are available for efficiently utilizing the computing elements, and they include making the processor capable of handling multithreads, and providing multiple architecture registers, and, in case a thread processing a packet is involved in a memory search, then switching a thread processing of another packet. In any case, when the processing required for the packet is complete, those results are generated as extracted information α411 and processing information 412 of the token and are returned to the cache miss handler 304.

The execution of processes that are judged to be too long, too complicated or that are control type processes rather than transfer type processes for network equipment can be requested from host processors installed in external locations. Examples of protocol processing, for example, for renewing or maintaining path information, are RIP (Routing Information Protocol) or OSPF (Open Shortest Path First), etc.

When the cache miss handler 304 receives the processed token 470 from the packet processor 305, it stores the token 470 in the processing information management table 703. The corresponding registration FIFO queue number 451 and the cache way Info. No. 453 are loaded from the cache miss management table 701, the entry for the corresponding process-cache data established and the extracted information α411 and the processing information 412 from the processing information table 703 are registered in the process-cache data 512. The signal 208 is utilized as information for notifying the cache traffic controller 102 that registration of the applicable token in the process cache has been completed. Data (460 of FIG. 4) comprised of FIFO queue registered number 451, the cacheable bit 461, and further, as an option, the priority information 425 for showing the priority of the applicable flow, and bandwidth information 426, for showing the usable bandwidth allowed for the applicable flow, is conveyed by the signal 208 to the cache traffic controller 102. The results from the processing in the packet processor are different in that a value of the cacheable bit 461 (for example 1) is shown when there is a token capable of being registered in the process cache, and in that a value (for example 0) is shown when the token cannot be registered for some reason. There is normally assumed to be a token capable of being registered in the process cache, but when a difficult and complicated software processing is required for hardware handling of the original packet, then it is not registered in the process cache and is processed in all the packet processors.

The token processed in the packet processor reads out the corresponding token unique information 401 and analyzed information 402 from the cache miss management table 701, and the extracted information α411 and processing information 412 from the processing information management table 703, and, after coupling it in the concatenator 704, conveys it to the post-processor 306.

The post-processor 306 receives the processed token 410 from the process cache 303 or the cache miss handler 304. If tokens are received simultaneously from both the process cache 303 and cache miss handler 304, then priority is given to the token received from the cache miss handler 304, since the packet sequence cannot be changed within the same flow.

The post-processor 306 searches the processing information 412 and analyzed information 402 for the token that was received and implements the processing required on the packet 454 that became the source so as to generate the applicable token. When there is information that must be substituted into the header, or added as a new header to the packet, then, the packet header is corrected based on information in the analyzed information 402 and the processing information 412, since there is information corresponding to the extracted information α411.

Finally, in the output interface 307, the packet is converted to a format allowing it to be sent, and it is then output. If the switch fabric, at this time, is linked to the cache-based packet processor, then switch fabric header information can be attached to the packet. For example, if a port number for the switch fabric is included, then the packet contains that extracted information α411 and processing information 412 which can be utilized. If it is linked to a network interface, then that network interface converts the packet into a format supporting layer 2 or layer 3 and outputs the packet. If the network interface at the output destination possesses multiple exits, then, of course, the network interface exit is selected by using the port number contained in the token.

Figure 10:
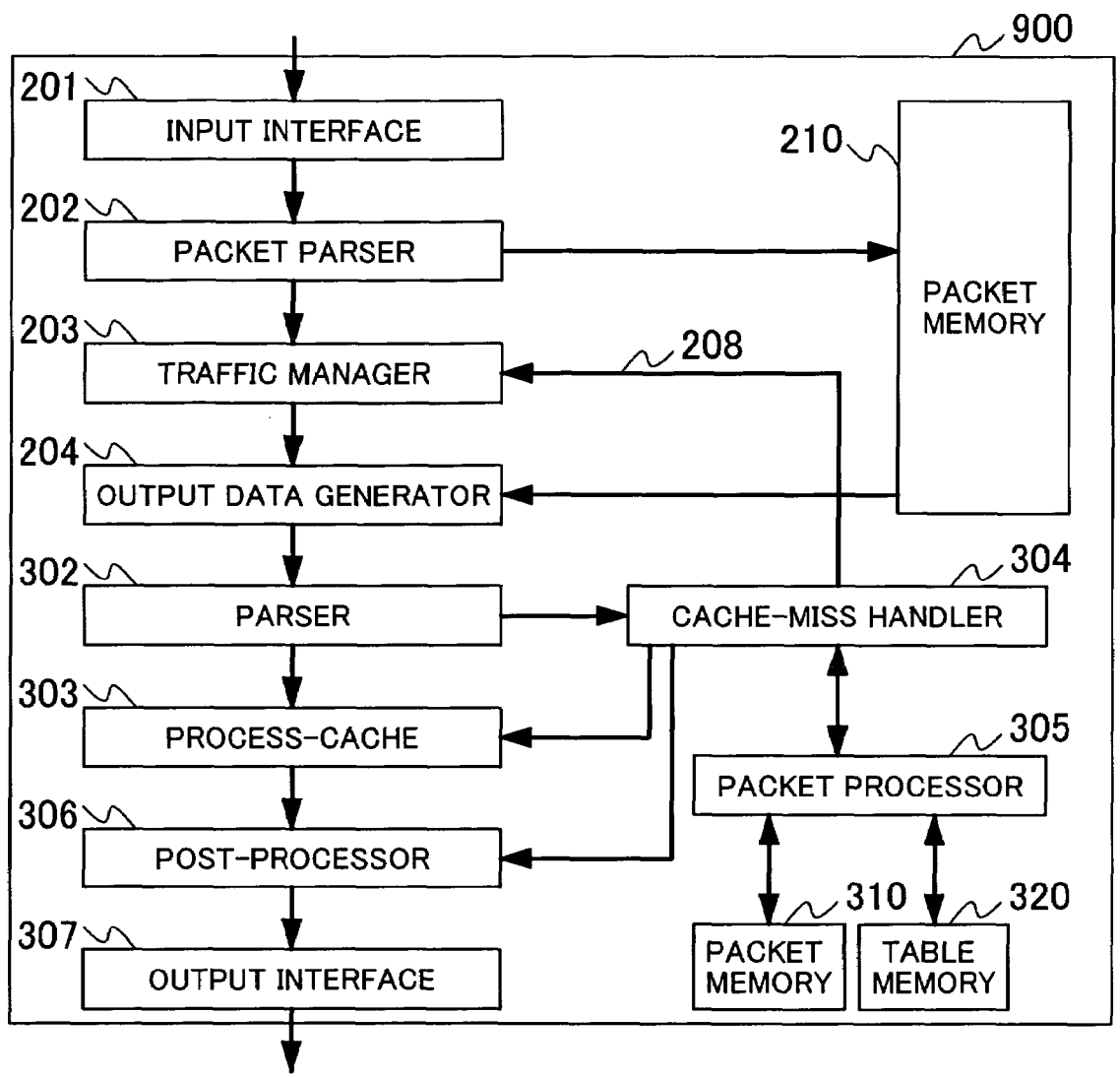
FIG. 10 is a block diagram showing the cache-based packet processor integrated with the cache traffic controller.

The above-described examples concern the mounting of the cache traffic controller 102 and the cache-based packet processor 103 on separate chips, however, both of these sections may be mounted on a single chip, as shown in FIG. 10. In such cases, a dedicated interface is not needed between the traffic controller for cache and the cache-based packet processor.

Second Embodiment

When utilizing the cache, multiple data of different types tends to concentrate at the same entries to the cache memory, and this causes a state called thrashing to occur where data will mutually overwrite each other, thereby destroying the cache entries. Consequently, frequently interchanging the cache entries will cause a drop in cache utilization efficiency. The (N-way) Set Associative method process cache and its FIFO queues for the traffic manager, as described in conjunction with the first embodiment, are contrived to reduce thrashing, but they might be inadequate to inhibit thrashing in small N values that are mountable in designated entries.

Therefore, in order to prevent a drop in performance due to thrashing, the cache traffic controller of the second embodiment of this invention contains a small volume fully associative process cache and FIFO queues and tags for the small volume fully associative process cache.

The fully associative process cache is a process cache where the degree-of-associativity equals the number of all entries in the process cache. This fully associative method is the most flexible method for linking an entry compared to the direct mapped method and the (N-way) Set Associative method, and it also has the highest cache-hit rate. However, the registration locations for the entries cannot be established all at once, and so it must possess comparators equal in number to the entries in order to simultaneously compare all entries to achieve high-speed operation, with the result that the installation cost is expensive. For this reason, small-scale fully associative process caches are utilized as a realistic means to support the (N-way) set associative method caches.

Figure 6:
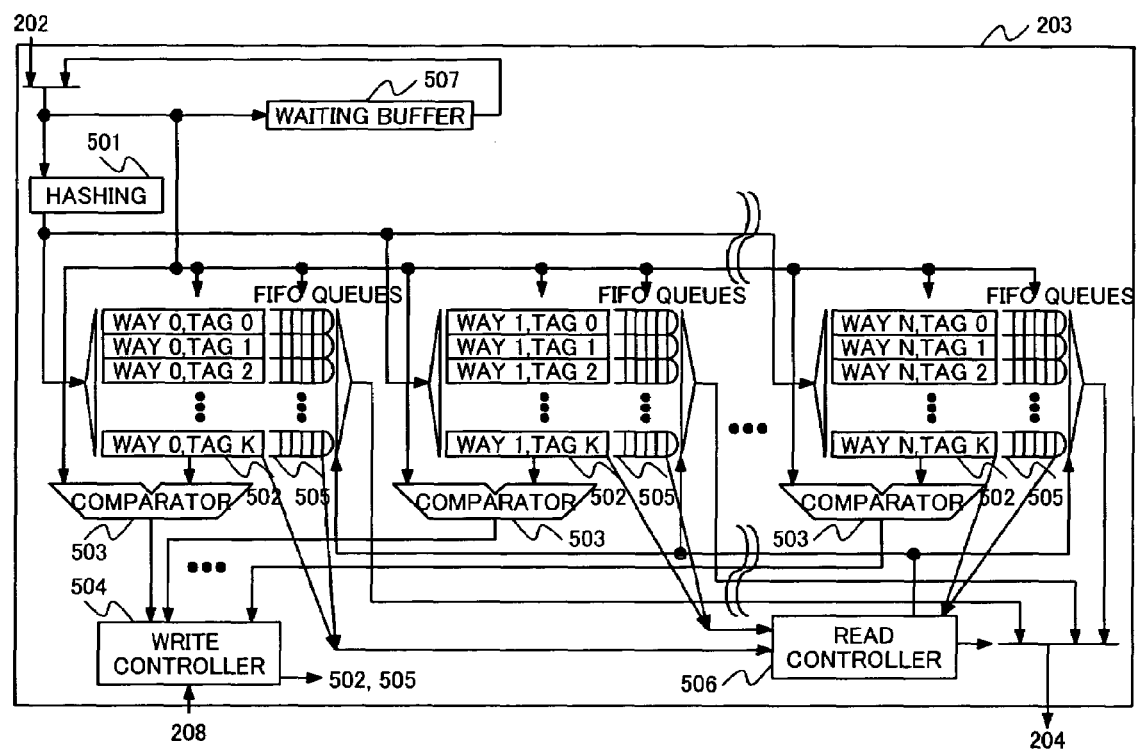
FIG. 6 is a block diagram of the traffic management section of the traffic controller for caches for implementing the N-weigh-set-associative method.
Figure 12:
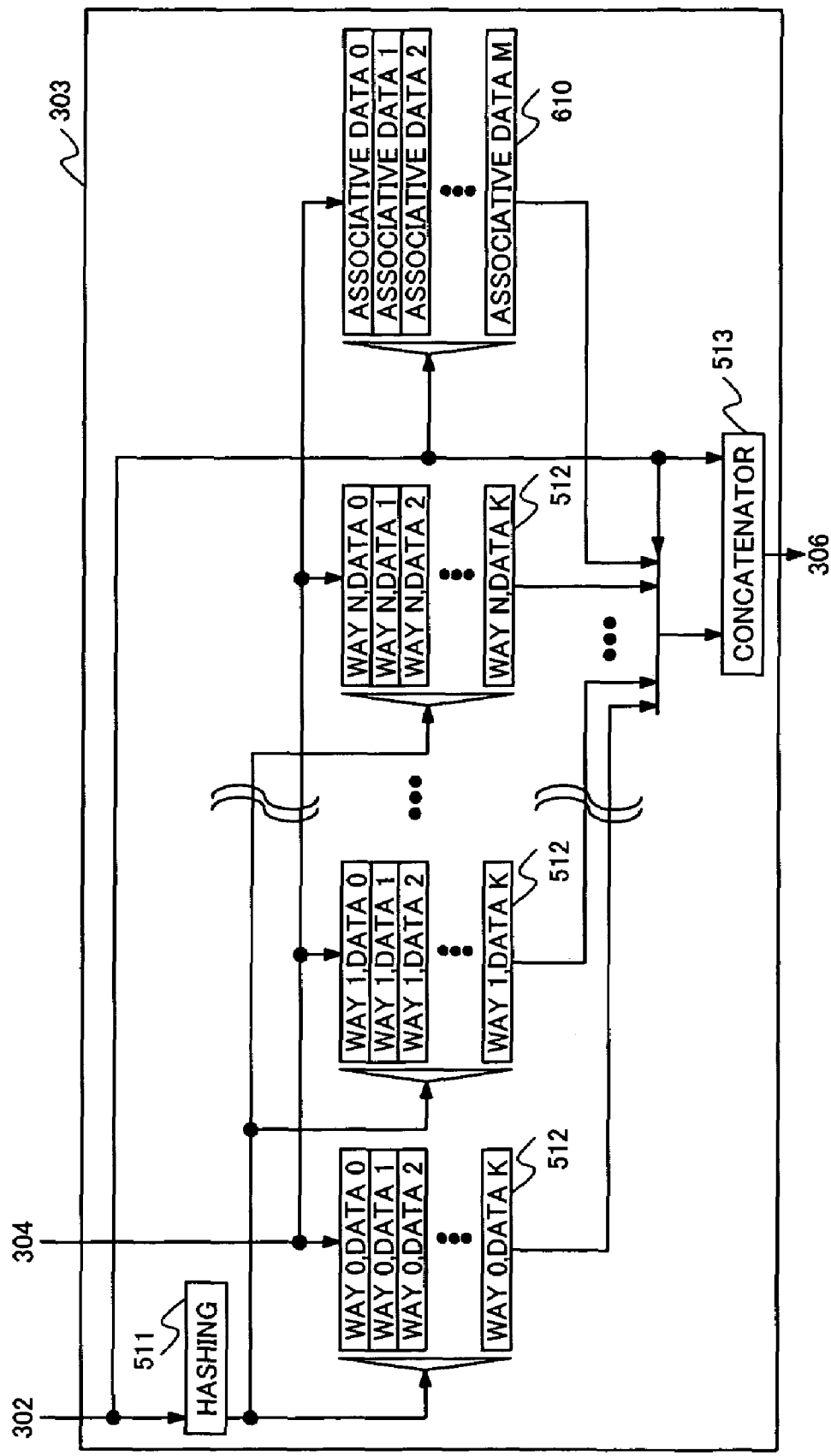
FIG. 12 is a block diagram showing when the data section of the process cache for the M entry—fully associative type cache-based packet processor has been added to the data section of the process cache for the N weight & set associative cache-based packet processor.

In addition to the (N-way) set associative tag (section) 502 and the FIFO queue 505 shown in FIG. 6, serving as the internal structure of the traffic manager 203 in FIG. 3, the structure of the second embodiment is comprised of an associative tag 601 and a corresponding FIFO queue 602 of the fully associative type, as shown in FIG. 1. The associative tag 601 possesses an internal comparator for each entry, and it can make a separate hit check for each entry. A CAM (Content Addressable Memory) is suitable for use in achieving the associative tag 601. Also, in addition to use of the (N-way) set associative data 512 shown in FIG. 8 as the internal structure, the process cache 303 of FIG. 3 also has a structure as shown in FIG. 12 possessing associative data 610 corresponding to the associative tag 601.

The operation of the traffic manager 203 in the second embodiment will be described next. When a token is received from the packet parser 202, the traffic manager 203 checks the set associative tag 502 with the token hashed by the hashing 501 and simultaneously checks the associative tag 601 with the token that is still not subjected to hashing. In the second embodiment, tokens are applied by means of the following two types of control methods according to circumstances.

(1) Tokens are managed using the set associative tag 502 and the FIFO queue 505 attached to that tag in the same manner as in the first embodiment, when the set associative tag 502 is a hit, or when there is a miss and there is a way not utilized in the set associative tag 502.

(2) Tokens are managed using an entry not utilized in the associative tag 601 when the set associative tag 502 is a miss, and there is no usable entry.

The fully associative cache process entry information is attached to the (notification) information 450 from the traffic controller for cache of FIG. 4 to the cache-based packet processor in order to specify an entry storage positions in the fully associative process cache. This fully associative cache process entry information is utilized to establish data storage entries for process-cache data possessing of a cache type packet management section.

Compared to the first embodiment, the second embodiment is superior in cases where packets from different flows are concentrated within a short time at the same entries in the process cache.

Third Embodiment

Figure 13:
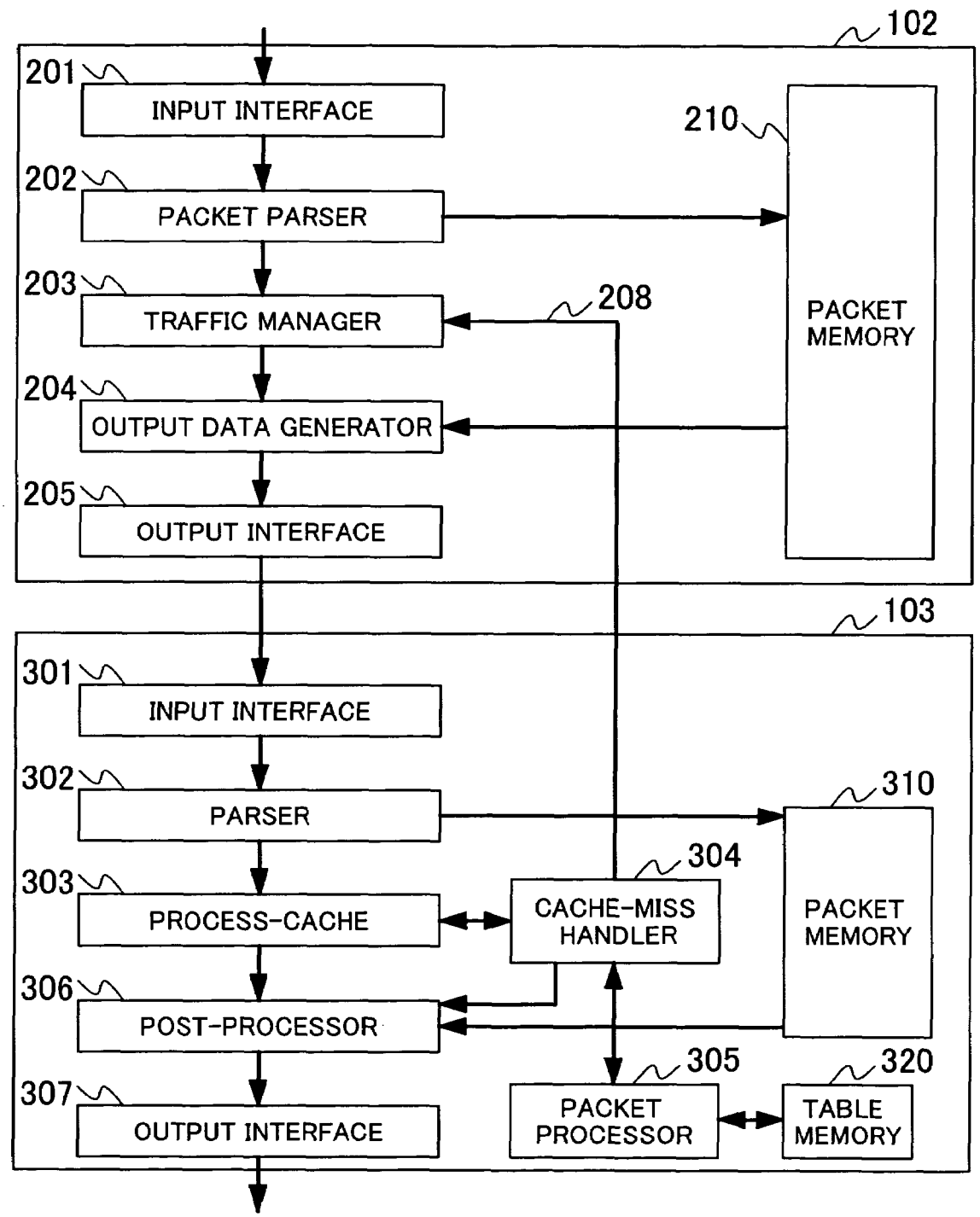
FIG. 13 is a block diagram showing the cache traffic controller and the cache-based packet processor when the process cache for the cache-based packet processor also possesses a tag.

The first embodiment and the second embodiment implement the mounting efficiency and are based on examples in which the process-cache memory tag is separate from the cache-based packet processor, and it is installed in the traffic controller for cache. The cache-based packet processor 103 may be a type that completely contains both the tags and the data section of the process-cache memory. As seen in FIG. 13, the third embodiment is a structure where the process-cache memory of the cache-based packet processor 103 possesses a tag (section) as well as a data section. The cache traffic controller 102 in the third embodiment possesses a structure identical to that of the first embodiment or second embodiment; however, when the output data generator 204 conveys information to the cache-based packet processor 103, the unique information 401, the analyzed information 402 and the extracted information 403 are removed from the format 450 of FIG. 4.

Figure 14:
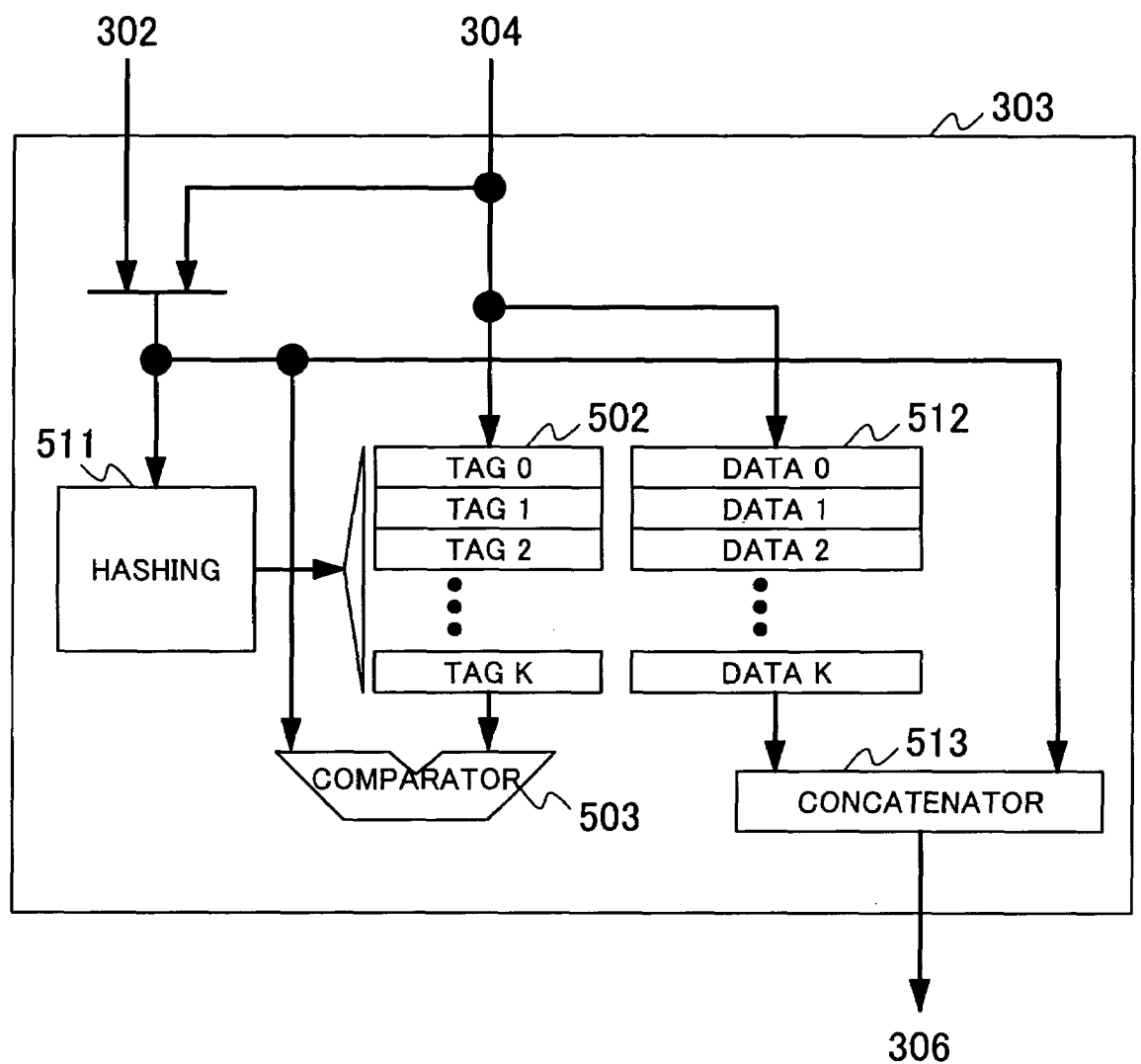
FIG. 14 is a block diagram of the direct map type process cache including a tag and a data section.

The cache-based packet processor 103 of the third embodiment includes a packet parser 302 possessing functions equivalent to the packet parser 202 of the cache traffic controller 102. The packet parser 302 receives the packet from the cache traffic controller 102 and generates the token 400 shown in FIG. 4. The cache traffic controller 102 also contains the process cache 303 possessing a tag and data. An example of a process cache 303 structure utilizing the direct mapped method is shown in FIG. 14. The process cache 303 is comprised of both a tag 502 and a data 512, and a hashing 511, a comparator 503 and a concatenator 513 for generating an access key from the token.

When the process cache 303 receives a token 400, the hashing 501 applies a hash to the analyzed information 402 and extracted information 403 of the token, and an access key for the tag 502 and the data section 512 of the process cache is generated, and a check is made of the tag 502. Next, the analyzed information 402 and extracted information 403 set output from the tag 502, and the analyzed information 402 and extracted information 403 set utilized for generating the access key are subjected to a matching inspection in the comparator 503. Sets that are a match are handled as a hit in the process cache, and sets that do not match are handled as a miss in the process cache. When a process-cache-hit occurs, the concatenator 513 couples the extracted information α411 and processing information 412 output from the tag 512, and the token unique information 401 and analyzed information 402 utilized in generating the access key, and conveys them to the post-processor 306. When a process-cache miss occurs, the token is conveyed to the cache miss handler 304, and after processing in the packet processor 305, a token 470 resulting from the processing is registered in the process cache 303. The signal 208 then conveys notification of the completion of cache registration in the format shown in 460 of FIG. 4, the same as in the first embodiment and the second embodiment.

Fourth Embodiment

Figure 15:
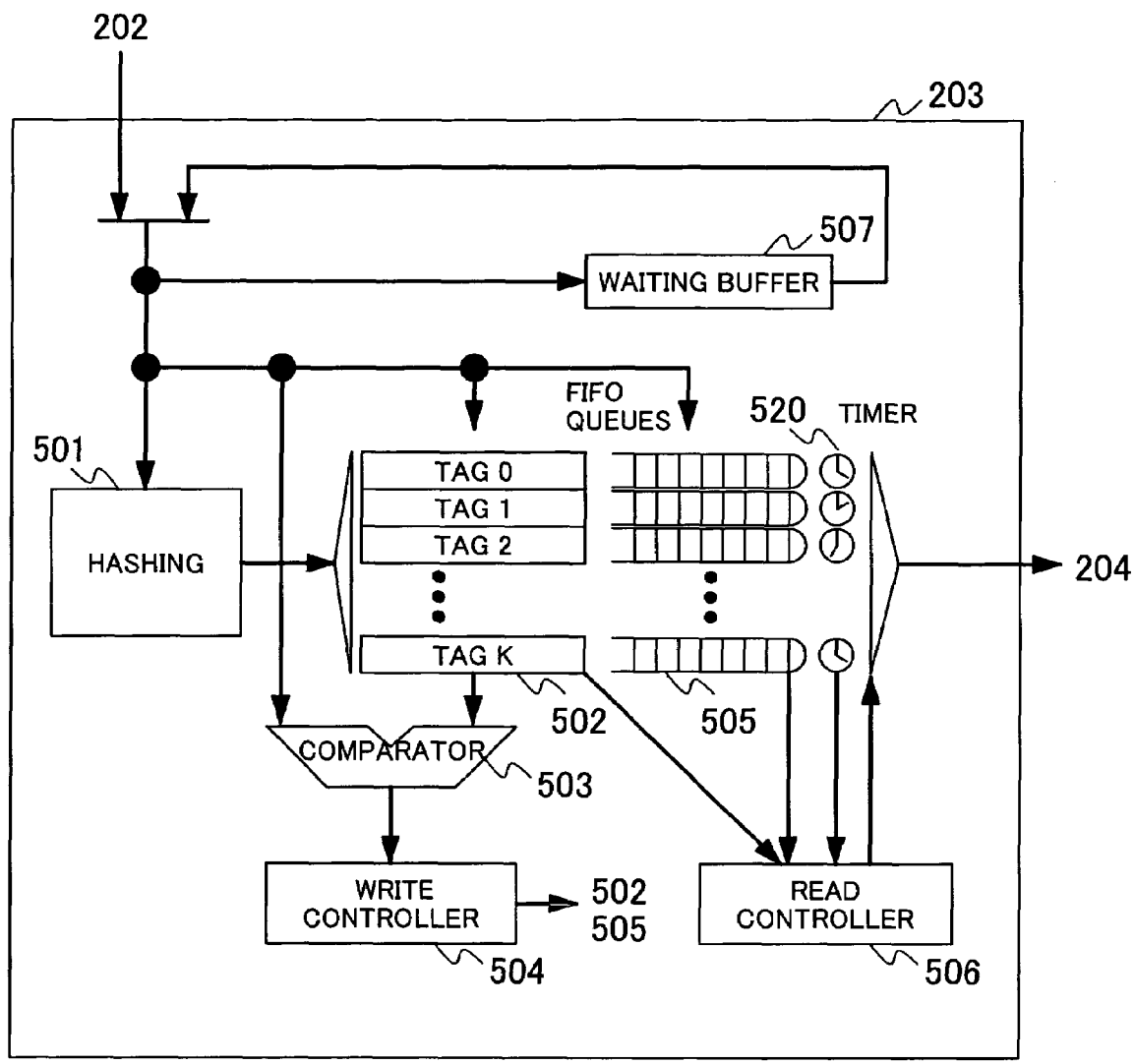
FIG. 15 is a block diagram of the traffic controller section of the cache traffic manager of FIG. 14.

The example representing the fourth embodiment corresponds to the structure of the third embodiment with the process-cache registration signal 208 removed. In this case, the traffic controller for cache 102 does not know the precise timing that the second and subsequent packets were issued, and, therefore, a timer 520 is installed at each entry of the traffic manager 203, as shown in FIG. 15, so that when the timer exceeds a threshold value, issue starts, since there is a high probability that a token is registered in the process cache 303 of the cache-based packet processor 103.

In the fourth embodiment, the registering of process results from the lead packet of the flow into the process cache cannot be guaranteed, so that preventing a drop in the hit rate during consecutive arrival of packets from the same flow, which is the essential object of this invention, cannot be guaranteed.

However, utilizing the fourth embodiment provides a structure where the cache-based packet processor 103 need not be aware of the presence of the cache traffic controller 102. Therefore, in network equipment mounted only with a cache-based packet processor 103, a device containing the functions of the cache traffic controller 102 of this invention can be added onto the network equipment as an upgrade (to prevent a drop in cache hits).

Fifth Embodiment

Those packets that were misses in the process cache are all processed in the packet processor. This embodiment assumes that the packet processing load will become high, and, therefore, the packet processor in the cache-based packet processor will require a higher throughput (high processing speed). In this case, a method is used where the packet processor 305, the packet memory 310 and the table memory 320 of FIG. 10 are mounted in on a separate chip, as shown in FIG. 16. Multiple cache-based packet processors, in this case, may be jointly used by the packet processor. Any of the methods of the first embodiment, second embodiment, third embodiment and the fourth embodiment may be utilized for the traffic manager 203.

The traffic controller for cache and the cache-based packet processor shown in FIG. 16 may be even further subdivided.

In accordance with the present invention, network equipment utilizing a traffic controller for cache and an embodiment utilizing the traffic controller for cache were described. However, the descriptions merely constitute examples and various adaptations may be applied to the invention without limiting the scope of the present invention.

The traffic controller for cache (cache traffic controller) is utilizable in network equipment possessing a cache-based packet processor for packet processing of data, such as frames and packets flowing on the network. By utilizing the cache traffic controller of this invention along with a cache-based packet processor, cache misses occurring due to the arrival sequence of network traffic at the network equipment, as well as a drop in processing speed in the network equipment due to cache misses, can be eliminated.

What is claimed is:

1. A network equipment comprising:
    a parser for executing a process for handling input packets as plural differing flows;
    a packet processor for implementing a processing of the packets;
    a cache including multiple entries for registering in each flow, a result of the processing implemented on the packets by the packet processor, to effect a registered flow;
    a post-processor for implementing a processing of the packets belonging to the registered flow in the cache; and
    a flow management queue group installed in a pre-stage of the cache, for holding packets belonging to flows corresponding to the entries of the cache; wherein
    a packet belonging to a first flow for which a result of the processing implemented on the packet by the packet processor is registered in the cache, is then processed not by the packet processor, but by the post-processor,
    when the network equipment receives packets belonging to a second flow for which a result of the processing implemented on a packet of the second flow by the packet processor is not registered in the cache, the packet processor implements a processing on a beginning packet of the second flow, and a result of the processing implemented on the beginning packet of the second flow is registered in the cache,
    the post-processor implements a processing on remaining packets, belonging to the second flow but following the beginning packet of the second flow, by utilizing the result of the processing implemented on the beginning packet of the second flow that is registered in the cache,
    when the network equipment receives packets belonging to a third flow while the queue in the flow management queue group holds further packets of the second flow following the beginning packet of the second flow, the post-processor implements a processing on a packet of the third flow before the post-processor completes implementing a processing of the further packets of the second flow; and
    wherein a flow management queue can be selected by referring to order priority information recorded in the information for identifying flows and the information for identifying flows can be extracted from the selected queue, when a plurality of information for identifying flows can be extracted from multiple flow management queues among the flow management queues for managing the information for identifying flows.

2. The network equipment according to claim 1, wherein:
    the cache comprises a cache tag section for recording information for identifying flows and a data section for recording the packet processing, and
    information assignment positions for the flow management queue corresponding to each entry of the data section and the cache tag section are multiple (N) locations in an N-way set associative format.

3. The network equipment according to claim 1, comprising a buffer for temporarily holding flows, to make the information for identifying flows and all subsequent flows wait until the flow management queue is free, when the flow management queue for the information for identifying flows is in use.

4. The network equipment according to claim 1, comprising a buffer for temporarily holding flows, to make the information for identifying flows and all subsequent identical flows wait until the flow management queue is free, when the flow management queue for the information for identifying flows is in use.

5. The network equipment according to claim 1, wherein bandwidth control information and information size is referred to, and a quantity of the information for identifying flows output from a flow management queue in the flow management queue group that output the information for identifying flows is restricted, when a plurality of the information for identifying flows can be extracted from multiple flow management queues among the flow management queues for managing information for identifying flows.

6. The network equipment according to claim 1, wherein
    a cache tag section for recording information for identifying flows and a section including the flow management queue for managing the information for identifying flows, are mounted on a single device, and
    a cache section for recording the packet processing is mounted on a device different from the device containing the cache tag section and section including the flow management queue.

7. The network equipment according to claim 1, wherein
    a cache tag section for recording information for identifying flows, and
    a section including the flow management queue for managing the information for identifying flows, and
    a cache section for recording the packet processing are mounted on a single device.

8. The network equipment according to claim 1, wherein:
    the cache comprises a cache tag section for recording information for identifying flows and a cache section for recording the packet processing,
    there are one or more assigned positions in the flow management queue for information corresponding to each entry of the cache tag section and the cache section, and the network equipment further comprises:
a freely assignable, small capacity fully associative cache tag section, cache section, and flow management queue when the assigned positions after flow sorting are being used.

9. The network equipment according to claim 6, wherein,
a section having a function equivalent to the cache tag section for recording information for identifying flows, is mounted on a device including a flow management queue; and is not mounted on another device including the cache section for recording the packet processing.

10. The network equipment according to claim 1, wherein
a section having a function equivalent to the cache tag section for recording information for identifying flows, is mounted on a device including a flow management queue; and the tag section is also mounted on the device including the cached data section for recording the packet processing.

11. The network equipment according to claim 10, wherein
even if packet processing results are registered on the cache for recording the packet processing, a cache registration notification signal is not conveyed to the flow management queue, and
each of the flow management queues possesses a timer, and
after the beginning packet of the flow management queue is sent to the packet processor section, the timer is started at the point that a preset threshold is exceeded,
the packets remaining in the flow management queue are implemented with a processing by referring to the cache.

12. The network equipment according to claim 1, wherein
the packet processor is mounted on a device different from a device including the cache.

13. A control method for controlling a network equipment including a packet processor, a flow management queue group, a cache and a post-processor, the flow management queue group corresponding one to one in number with cache entries in the cache and installed in a pre-stage of the cache, the method comprising:
generating internal processing information strings from packets, for handling the packets transferred over a network as flows, an internal processing information string including a first information combining information linking one packet with one internal processing information string and differing in each packet, a second information for identifying type of protocol of the packet for each layer on the network, and a third information extracted from headers of the packet corresponding to each layer on the network, and
sorting the packets into differing flows according to the second information and the third information,
by the packet processor, a result of the processing implemented on the packet by the packet processor is generated as a fourth information, and rewriting the third information as the fourth information if required, and
utilizing the cache for recording the third and fourth information as data for use for packets in the same flow, by the flow management queue group, holding the packet sorted to the flow, and
by a queue in the flow management queue group, first of all issuing request for processing the beginning packet of a first flow for which a result of the processing implemented on the packet by the packet processor is not registered in the cache and,
after the queue receives notification that processing results for the beginning packet of the first flow are registered in the cache, and the post-processor implements a processing on packets belonging to the first flow and following the beginning packet of the first flow by utilizing the result of the processing implemented on the beginning packet of the first flow that is registered in the cache, and if the network equipment receives packets belonging to a second flow whose result of a processing by the packet processor is recorded in the cache while the packet of the first flow is being held in the queue, then, by the post-processor, implementing a processing on the packets belonging to the second flow overtaking the packet belonging to the first flow and following the beginning packet of the first flow.

14. A network equipment comprising:
an input interface for receiving packets;
a packet parser for analyzing and sorting the received packets, and generating flows in each differing type;
a traffic manager for managing the generated flows while maintaining the order in which the packets were received per each type;
a packet processor for processing the packets;
a post-processor; and
a process cache for registering the packet processing results per each flow,
wherein the network equipment:
(1) processes in the packet processor, a first packet of a first flow, whose processing results by the packet processor are not registered in the process cache,
(2) makes the packets subsequent to the first packet of the first flow wait until processing results of the first packet are registered in the process cache, and after being registered, utilizing the information in the process cache for the post-processor to process the subsequent packets,
(3) controls the flow so that packets in a second flow for which a processing result by the packet processor are already registered in the process cache processed before packets that are waiting, while packets subsequent to the first packet of the first flow are waiting;
wherein the traffic manager includes a queue for holding and storing internal processing information strings corresponding to the generated flow while maintaining the order in which the packets were received; and
the internal processing information string stored in the queue contains registration-complete information indicating whether or not processing results for a corresponding packet are registered in the process cache.

15. The network equipment according to claim 14, wherein
a pre-stage of the packet processor contains a parser for selecting whether to process the packet in the packet processor or process referring to the process cache.

16. The network equipment according to claim 15, comprising a cache miss handler for notifying the traffic manager that registration of the processing results in process cache was completed, when a packet was processed in the packet processor.

17. The network equipment according to claim 16, wherein the traffic manager attaches the registered information to the internal processing information string, based on the notification from the cache miss handler.

18. The network equipment according to claim 17, wherein the traffic manager controls the flow referring to the registered information.

19. The network equipment according to claim 14, wherein the first packet of the first flow is the beginning packet of the first flow whose processing results are not registered in the process cache.

20. The network equipment according to claim 14, wherein the packet of the second flow is a beginning packet whose processing results are not registered in the process cache, or a subsequent packet whose processing results are registered in the process cache.

* * * * *